(12) United States Patent
Switzer, III et al.

(10) Patent No.: US 10,775,649 B2
(45) Date of Patent: Sep. 15, 2020

(54) ELASTOMERIC OPTICAL DEVICE AND RELATED METHODS

(71) Applicant: Cardinal CG Company, Eden Prairie, MN (US)

(72) Inventors: James Clark Switzer, III, Prairie Du Sac, WI (US); Keith James Burrows, Mineral Point, WI (US)

(73) Assignee: CARDINAL CG COMPANY, Eden Prairie, MN (US)

( * ) Notice: Subject to any disclaimer, the term of this patent is extended or adjusted under 35 U.S.C. 154(b) by 244 days.

(21) Appl. No.: 15/982,677

(22) Filed: May 17, 2018

(65) Prior Publication Data

US 2019/0353937 A1 Nov. 21, 2019

(51) Int. Cl.
*G02F 1/01* (2006.01)
*G02B 26/00* (2006.01)
(Continued)

(52) U.S. Cl.
CPC .......... *G02F 1/0131* (2013.01); *E06B 3/6722* (2013.01); *E06B 9/24* (2013.01);
(Continued)

(58) Field of Classification Search
CPC ............... G02F 1/0131; G02F 2201/12; G02F 2202/022; G02F 2202/36; E06B 3/6722; E06B 9/24; E06B 2009/2464
(Continued)

(56) References Cited

U.S. PATENT DOCUMENTS

| 4,893,908 A | 1/1990 | Wolf et al. |
| 5,042,923 A | 8/1991 | Wolf et al. |

(Continued)

FOREIGN PATENT DOCUMENTS

CN 107357053 A 11/2017

OTHER PUBLICATIONS

International Patent Application No. PCT/US2019/030391, International Search Report and Written Opinion dated Aug. 8, 2019, 14 pages.

(Continued)

*Primary Examiner* — William Choi
(74) *Attorney, Agent, or Firm* — Fredrikson & Byron, P.A.

(57) ABSTRACT

The invention provides an elastomeric optical device having a first optical state and a second optical state. The device is transparent when in the first optical state and is translucent or opaque when in the second optical state. The device comprises, in sequence, an optional substrate, a first transparent electrode, an optional dielectric layer, an elastomer layer, and a second transparent electrode. In some embodiments, the second transparent electrode comprises an electrically-conductive polymer, transparent electrically-conductive nanoparticles, or both. In such embodiments, the second transparent electrode is configured to compress the elastomer layer in response to an electric field between the first and second transparent electrodes, such that when the elastomeric optical device is in the second optical state the elastomer layer is compressed between the first and second transparent electrodes. One or both of the elastomer layer and the second transparent electrode has one or more non-uniformity features.

51 Claims, 12 Drawing Sheets

(51) Int. Cl.
 E06B 3/67 (2006.01)
 E06B 9/24 (2006.01)
(52) U.S. Cl.
 CPC .. E06B 2009/2464 (2013.01); G02F 2201/12 (2013.01); G02F 2202/022 (2013.01); G02F 2202/36 (2013.01)
(58) Field of Classification Search
 USPC .................................................. 359/290, 295
 See application file for complete search history.

(56) References Cited

U.S. PATENT DOCUMENTS

| | | | |
|---|---|---|---|
| 5,111,327 | A | 5/1992 | Blohm et al. |
| 5,186,860 | A | 2/1993 | Joyce, Jr. et al. |
| 5,187,608 | A | 2/1993 | Blohm et al. |
| 5,253,100 | A | 10/1993 | Yang et al. |
| 6,452,711 | B1 | 9/2002 | Heuer et al. |
| 6,461,541 | B1 | 10/2002 | Lee et al. |
| 6,605,391 | B2 | 8/2003 | Chen et al. |
| 6,747,780 | B2 | 6/2004 | Xu et al. |
| 6,791,738 | B2 | 9/2004 | Reynolds et al. |
| 7,002,722 | B2 | 2/2006 | Xu et al. |
| 7,038,828 | B2 | 5/2006 | Xu et al. |
| 7,256,923 | B2 | 8/2007 | Liu et al. |
| 7,339,728 | B2 | 3/2008 | Hartig |
| 7,342,708 | B2 | 3/2008 | Ho et al. |
| 7,342,716 | B2 | 3/2008 | Hartig |
| 7,354,531 | B2 | 4/2008 | Boon et al. |
| 7,450,290 | B2 | 11/2008 | Xu et al. |
| 7,572,509 | B2 | 8/2009 | Hartig |
| 7,572,510 | B2 | 8/2009 | Hartig |
| 7,572,511 | B2 | 8/2009 | Hartig |
| 7,764,416 | B2 | 7/2010 | Wu |
| 7,833,592 | B2 | 11/2010 | Pilloy |
| 7,867,616 | B2 | 1/2011 | Harutyunyan |
| 7,884,994 | B2 | 2/2011 | Piroux |
| 7,906,203 | B2 | 3/2011 | Hartig |
| 7,940,447 | B2 | 5/2011 | Wu et al. |
| 8,049,949 | B2 | 11/2011 | Schwendeman et al. |
| 8,179,587 | B2 | 5/2012 | Weber et al. |
| 8,593,714 | B2 | 11/2013 | Agrawal et al. |
| 8,749,009 | B2 | 6/2014 | Young et al. |
| 8,995,039 | B2 | 3/2015 | Bartug et al. |
| 9,185,798 | B2 | 11/2015 | Young et al. |
| 9,207,515 | B2 | 12/2015 | Chandrasekhar |
| 9,249,353 | B2 | 2/2016 | Posset et al. |
| 9,274,395 | B2 | 3/2016 | Chandrasekhar |
| 9,302,452 | B2 | 4/2016 | Uprety et al. |
| 9,341,913 | B2 | 5/2016 | Milliron et al. |
| 9,377,662 | B2 | 6/2016 | Lee et al. |
| 9,594,284 | B2 | 3/2017 | Chandrasekhar |
| 9,720,299 | B1 | 8/2017 | Timmerman et al. |
| 9,766,528 | B2 | 9/2017 | Kloeppner et al. |
| 9,785,031 | B2 | 10/2017 | Mattox et al. |
| 9,791,760 | B2 | 10/2017 | Garcia et al. |
| 9,862,640 | B2 | 1/2018 | Pfaff et al. |
| 2005/0248825 | A1 | 11/2005 | Warren et al. |
| 2007/0082124 | A1 | 4/2007 | Hartig |
| 2012/0234465 | A1 | 9/2012 | Wen et al. |
| 2013/0016271 | A1 | 1/2013 | Kwon et al. |
| 2013/0020113 | A1 | 1/2013 | Corbea et al. |
| 2014/0175281 | A1 | 6/2014 | Reynolds et al. |
| 2014/0183423 | A1 | 7/2014 | Kim et al. |
| 2015/0070743 | A1 | 3/2015 | Branda et al. |
| 2016/0011482 | A1 | 1/2016 | Danine et al. |
| 2016/0242282 | A1 | 8/2016 | Uprety et al. |
| 2016/0244625 | A1 | 8/2016 | Clapp et al. |
| 2017/0097551 | A1 | 4/2017 | Garcia et al. |
| 2017/0184936 | A1 | 6/2017 | Chandrasekhar |
| 2017/0297058 | A1 | 10/2017 | Jiang et al. |
| 2017/0299911 | A1 | 10/2017 | Woo et al. |
| 2017/0329196 | A1 | 11/2017 | Timmerman et al. |
| 2017/0357136 | A1 | 12/2017 | Kloeppner et al. |
| 2018/0011359 | A1 | 1/2018 | De Jong et al. |
| 2018/0050524 | A1 | 2/2018 | Sun et al. |
| 2018/0246318 | A1* | 8/2018 | Shian ............... G02B 26/02 |
| 2019/0041680 | A1* | 2/2019 | Yoshida ........... G02F 1/133308 |

OTHER PUBLICATIONS

Ong et al., "Crumpled indium-tin-oxide electrodes for transparency tuning," Proceedings of the SPIE, vol. 9798, Apr. 15, 2016, 7 pages.

Cao et al., "Harnessing Localized Ridges for High-Aspect-Ratio Hierarchical Patterns with Dynamic Tunability and Multifunctionality," Advanced Materials, Mar. 2014, vol. 26, No. 11, 16 pages.

Chung et al., "Solution-Processed Flexible Transparent Conductors Composed of Silver Nanowire Networks Embedded in Indium Tin Oxide Nanoparticle Matrices," Nano Research, 2012, 10 pages.

Dattoli et al., "ITO nanowires and nanoparticles for transparent films," Materials Research Society, vol. 36, Oct. 2011, pp. 782-788.

Ende et al., "Voltage-Controlled Surface Wrinkling of Elastomeric Coatings," Advanced Materials, Pre-Peer Reviewed Article, 2013, 13 pages.

Fallahian et al., "Preparation of Conductive, Flexible and Transparent Films by In Situ Deposition of Polypyrrole Nanoparticles on Polyethylene Terephthalate," Polymer Science, Series B, Apr. 2017, 13 pages.

Heo et al., "Template-Free Mesoporous Electrochromic Films on Flexible Substrates from Tungsten Oxide Nanorods," Nano Letters, vol. 17, 2017, pp. 5756-5761.

Khondoker et al., "Flexible and conductive ITO electrode made on cellulose film by spin-coating," Synthetic Metals, vol. 162, 2012, pp. 1972-1976.

Lee et al., "Switchable Transparency and Welling of Elastomeric Smart Windows," Advanced Materials, vol. 22, 2010, pp. 5013-5017.

Liu et al., "Highly Stretchable and Flexible Graphene/ITO Hybrid Transparent Electrode," Nanoscale Research Letters, vol. 11, No. 108, 2016, 7 pages.

Ong et al., "Microscopically Crumpled Indium-Tin-Oxide Thin Films as Compliant Electrodes with Tunable Transmittance," Applied Physics Letters, vol. 107, No. 13, Sep. 2015, 16 pages.

Sakamoto et al., "Highly flexible transparent electrodes based on mesh-patterned rigid indium tin oxide," Scientific Reports, vol. 8, No. 2825, 2018, 8 pages.

Shian et al., "Highly Compliant Transparent Electrodes," Applied Physics Letters, vol. 101, No. 6, 2012, 13 pages.

Shrestha et al., "Tunable window device based on micro-wrinkling of nanometric zinc-oxide thin film on elastomer," Optics Letters, vol. 41, No. 19, Oct. 2016, pp. 4433-4436.

Zang et al., "Multifunctionality and control of the crumpling and unfolding of large-area graphene," Nature Materials, vol. 12, Apr. 2013, pp. 321-325.

Duraisamy et al., "Deposition and characterization of silver nanowires embedded PEDOT:PSS thin films via electrohydrodynamic atomization," Chemical Engineering Journal, vol. 225, Jun. 2013, pp. 887-894.

* cited by examiner

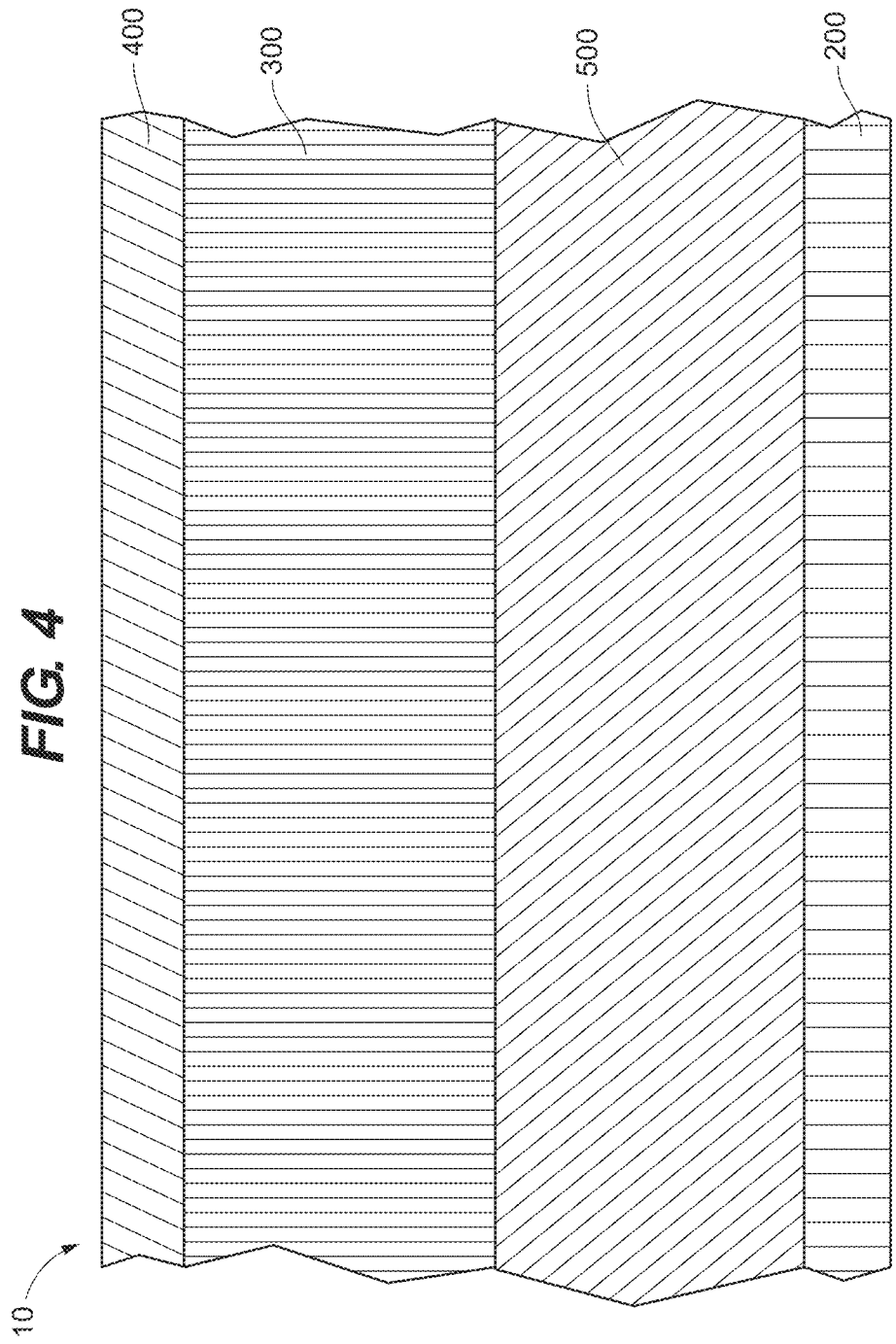

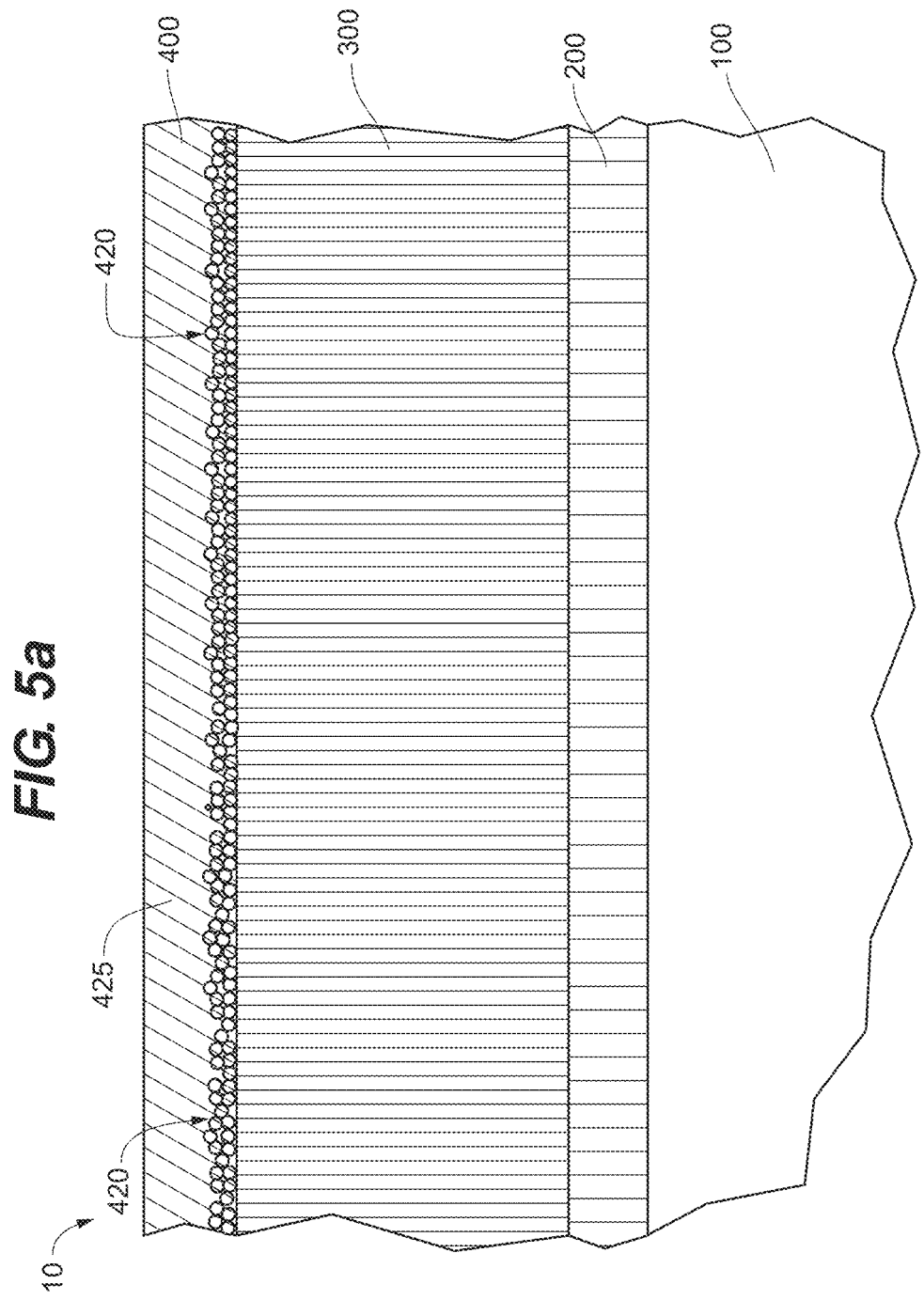

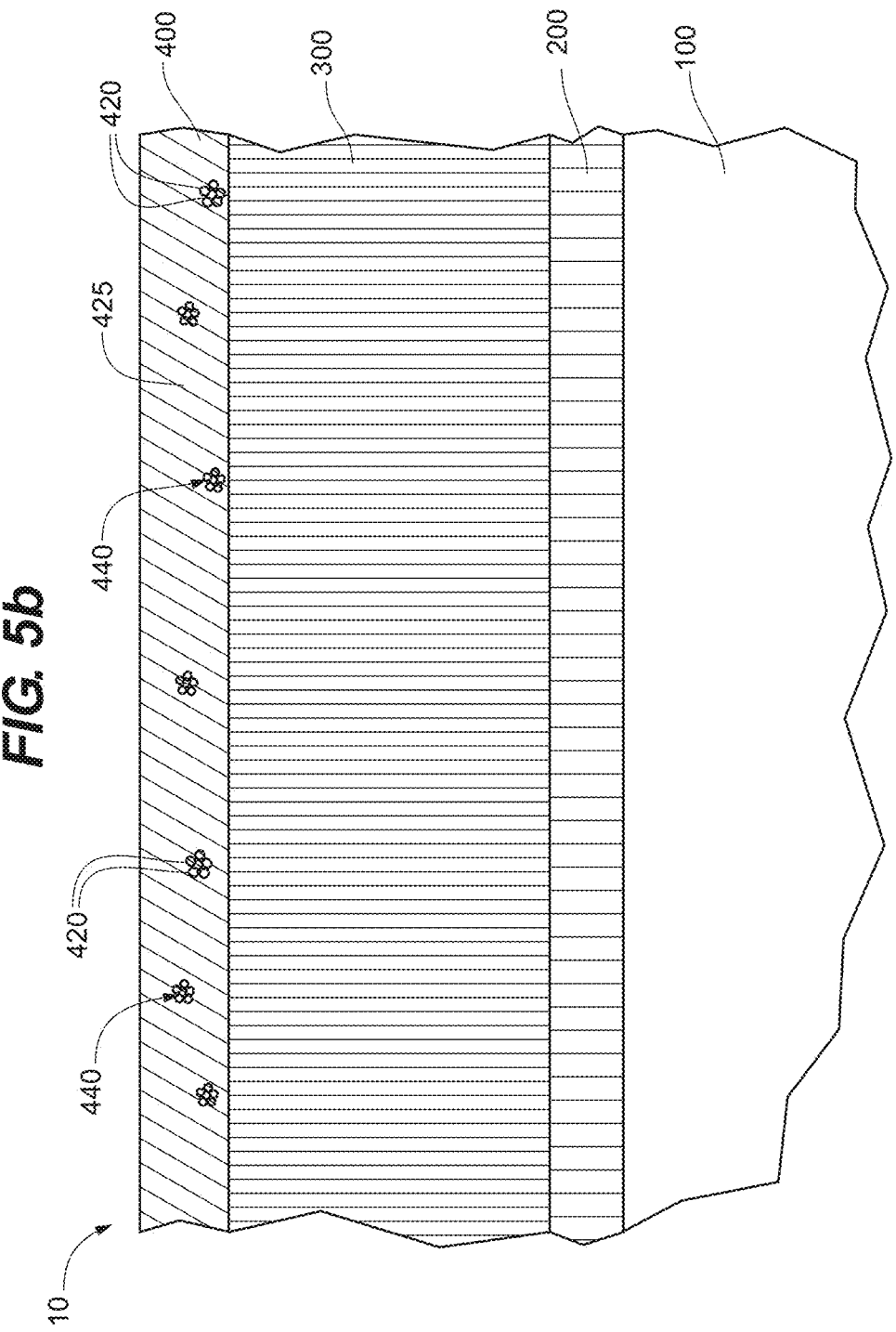

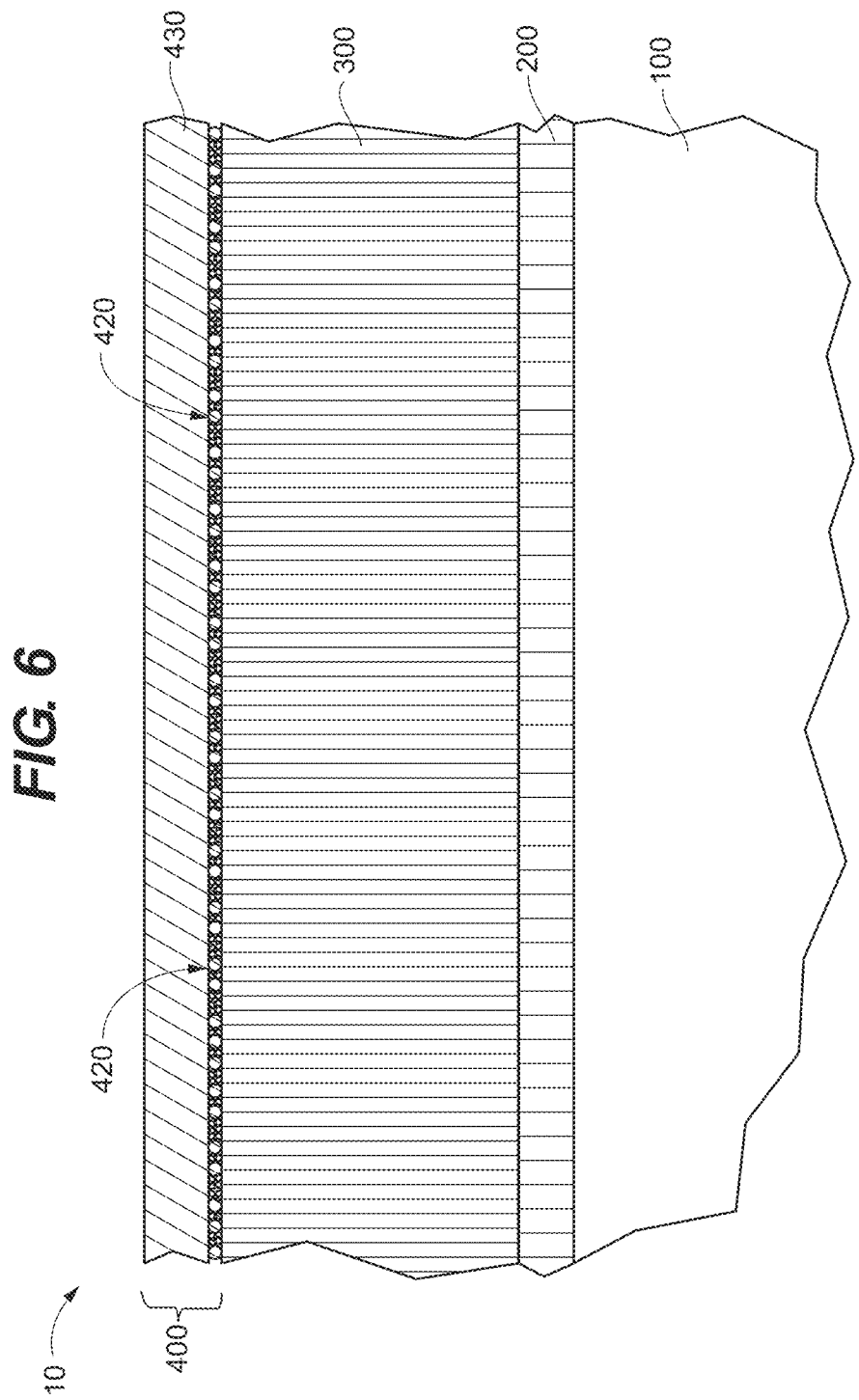

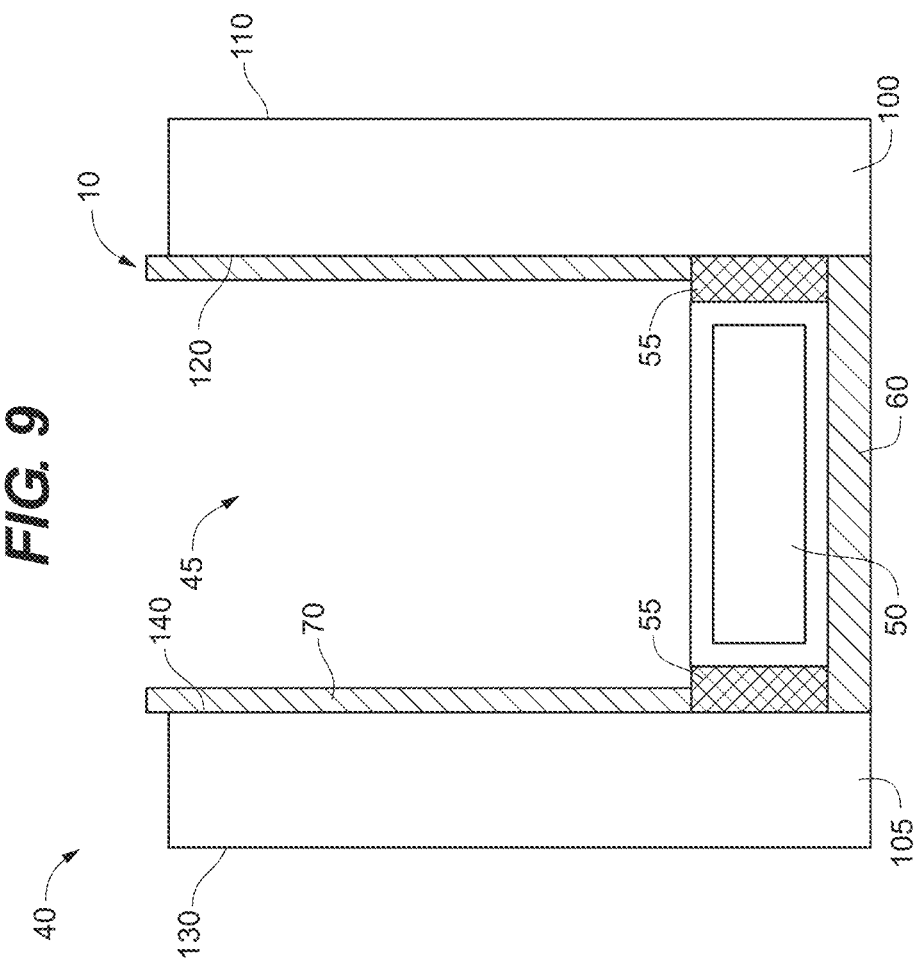
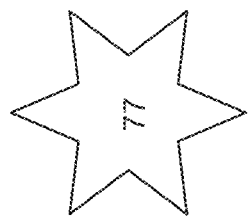
FIG. 9

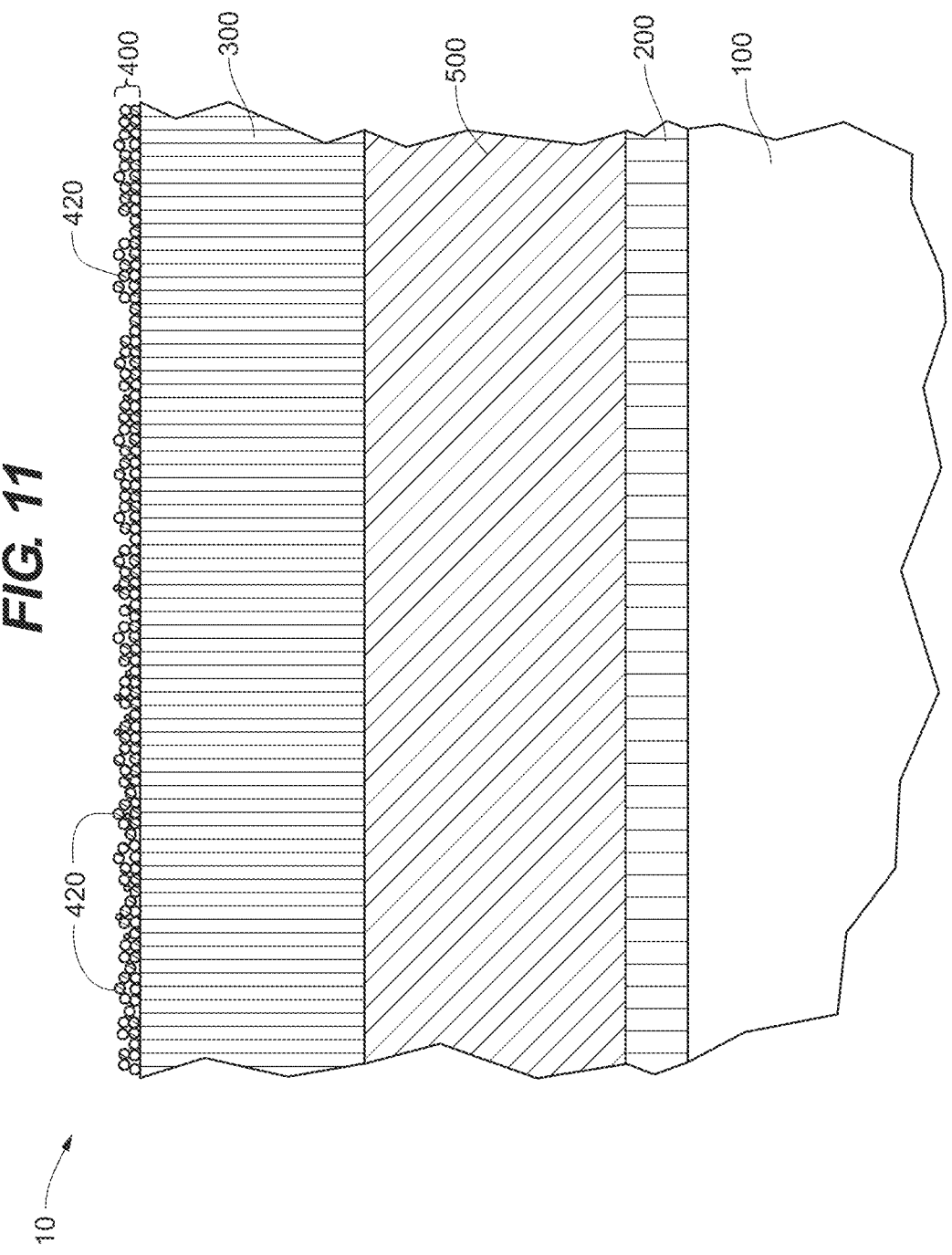

ELASTOMERIC OPTICAL DEVICE AND RELATED METHODS

FIELD OF THE INVENTION

The present invention relates generally to an elastomeric optical device. More particularly, this invention relates to an elastomeric optical device having an elastomer layer that is compressed between two transparent electrodes in response to establishing an electric field between the two transparent electrodes. The present invention also provides methods for operating such devices.

BACKGROUND OF THE INVENTION

Certain elastomeric optical devices are known. One such device has the following structure: glass substrate/indium tin oxide bottom electrode layer/acrylate-based elastomer layer/gold top electrode layer. When a sufficient voltage is applied between the top and bottom electrode layers, a change occurs in the optical properties of the device. For example, a voltage-induced wrinkling of the elastomer layer occurs. The wrinkling causes diffusion or scattering of light transmitted through the wrinkled elastomer/gold. A device of this nature is reported in van den Ende et al., *Voltage-Controlled Surface Wrinkling of Elastomeric Coatings*, Adv. Mater. 2013; 25: 3438-3442.

As set forth in the present disclosure, it would be desirable to provide an elastomeric optical device where the top electrode, bottom electrode, or both are easy to deposit, preferably at room temperature so as to enable certain temperature-sensitive materials (e.g., polymers) to be used. Additionally or alternatively, it would be desirable to provide a device where the top electrode has advanced characteristics in terms of being so compliant and deformable as not to exhibit undue stiffness or cracking over time. It would also be desirable to provide an elastomeric optical device having a top electrode, bottom electrode, or both that enable process control or have film structuring (e.g., patterning or other non-uniformity).

SUMMARY OF THE INVENTION

In some embodiments, the invention provides an elastomeric optical device that comprises, in sequence, a first transparent electrode, an elastomer layer, and a second transparent electrode. The second transparent electrode comprises an electrically-conductive polymer, electrically-conductive nanoparticles comprising a metal oxide, or both. The elastomeric optical device has a first optical state and a second optical state. The elastomeric optical device is transparent when in the first optical state and translucent or opaque when in the second optical state. The second transparent electrode is configured to compress the elastomer layer in response to an electric field between the first and second transparent electrodes, such that when the elastomeric optical device is in the second optical state the elastomer layer is compressed between the first and second transparent electrodes. In addition, where the second transparent electrode comprises the electrically-conductive nanoparticles, the nanoparticles preferably have an average major dimension of less than 150 nm.

Certain other embodiments of the invention provide an elastomeric optical device that comprises, in sequence, a first transparent electrode, an elastomer layer, and a second transparent electrode. The second transparent electrode comprises an electrically-conductive polymer, electrically-conductive nanoparticles having an average major dimension of less than 150 nm, or both. The elastomeric optical device has a first optical state and a second optical state. The elastomeric optical device is transparent when in the first optical state and translucent or opaque when in the second optical state. The second transparent electrode is configured to compress the elastomer layer in response to an electric field between the first and second transparent electrodes, such that when the elastomeric optical device is in the second optical state the elastomer layer is compressed between the first and second transparent electrodes. In embodiments where the second transparent electrode comprises electrically-conductive nanoparticles, they can optionally comprise a metal oxide.

In yet other embodiments of the present invention, an elastomeric optical device is provided that comprises, in sequence, a first transparent electrode, an elastomer layer, and a second transparent electrode. The first transparent electrode comprises an electrically-conductive polymer, electrically-conductive nanoparticles comprising a metal oxide, or both. The second transparent electrode comprises carbon nanotubes or silver nanowires. The elastomeric optical device has a first optical state and a second optical state. The elastomeric optical device is transparent when in the first optical state and translucent or opaque when in the second optical state. The second transparent electrode is configured to compress the elastomer layer in response to an electric field between the first and second transparent electrodes, such that when the elastomeric optical device is in the second optical state the elastomer layer is compressed between the first and second transparent electrodes. In addition, where the first transparent electrode comprises the electrically-conductive nanoparticles, the nanoparticles preferably have an average major dimension of less than 150 nm.

In still other embodiments of the present invention, an elastomeric optical device is provided that comprises, in sequence, a first transparent electrode, an elastomer layer, and a second transparent electrode. The first transparent electrode comprises an electrically-conductive polymer, electrically-conductive nanoparticles having an average major dimension of less than 150 nm, or both. The second transparent electrode comprises carbon nanotubes or silver nanowires. The elastomeric optical device has a first optical state and a second optical state. The elastomeric optical device is transparent when in the first optical state and translucent or opaque when in the second optical state. The second transparent electrode is configured to compress the elastomer layer in response to an electric field between the first and second transparent electrodes, such that when the elastomeric optical device is in the second optical state the elastomer layer is compressed between the first and second transparent electrodes. In embodiments where the first transparent electrode comprises electrically-conductive nanoparticles, the nanoparticles preferably comprise a metal oxide.

BRIEF DESCRIPTION OF THE DRAWINGS

FIG. 4 is a schematic, broken-away cross-sectional view of an elastomeric optical device in accordance with still other embodiments of the present disclosure.

FIG. 5a is a schematic, broken-away cross-sectional view of an elastomeric optical device having a second transparent electrode with electrically-conductive nanoparticles embedded in an electrically-conductive polymer matrix, where the nanoparticles form a nanoparticulate film in accordance with certain embodiments of the present disclosure.

FIG. 5b is a schematic, broken-away cross-sectional view of an elastomeric optical device having a second transparent electrode with electrically-conductive nanoparticles embedded in an electrically-conductive polymer matrix, where the nanoparticles form nanoparticle regions in accordance with certain embodiments of the present disclosure.

FIG. 6 is a schematic, broken-away cross-sectional view of an elastomeric optical device having a second transparent electrode with an electrically-conductive polymer layer over electrically-conductive nanoparticles in accordance with certain embodiments of the present disclosure.

FIG. 9 is a partially broken-away schematic cross-sectional side view of a multiple-pane insulating glazing unit that includes an exterior pane defining a second surface having a low-emissivity coating and an interior pane defining a third surface that carries an elastomeric optical device in accordance with certain embodiments of the present disclosure.

FIG. 11 is a schematic, broken-away cross-sectioned view of an elastomeric optical device having a second transparent electrode comprising electrically-conductive nanoparticles.

DETAILED DESCRIPTION OF PREFERRED EMBODIMENTS

Figure 1:
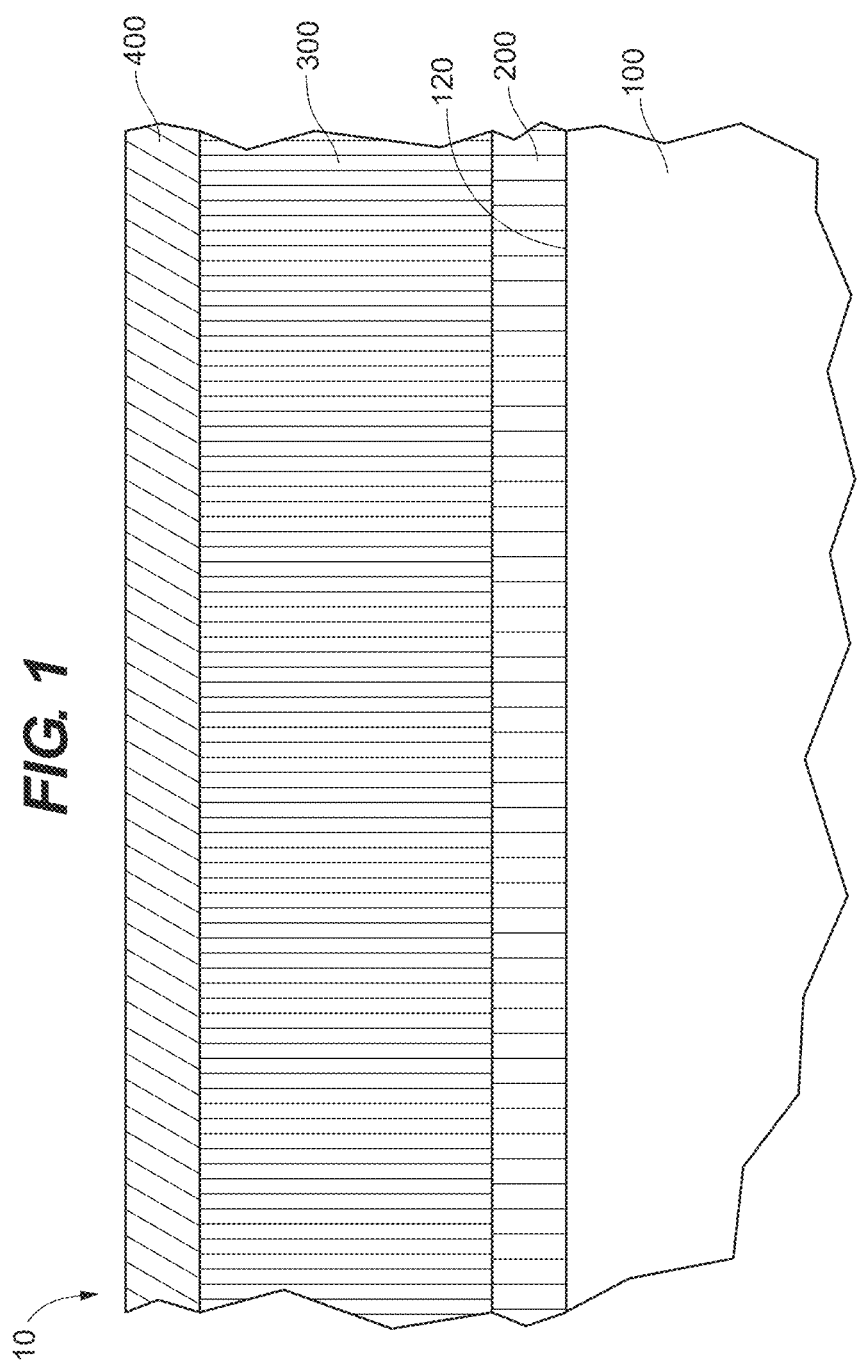
FIG. 1 is a schematic, broken-away cross-sectional view of an elastomeric optical device in accordance with certain embodiments of the present disclosure.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, and in particular, FIG. 1, there is shown an elastomeric optical device ("EOD") of the present disclosure generally represented by reference numeral 10. The EOD 10 has switchable optical properties. It is configured to provide deformation of an elastomer layer 300 in response to an electric field.

The EOD 10 has a first optical state and a second optical state. The EOD 10 is transparent when in the first optical state, and translucent or opaque when in the second optical state. The term "transparent," as used in the present disclosure, refers to a material that has a direct transmission of visible radiation of at least 50% and a diffuse transmission of visible radiation of less than 10%. "Translucent," as used herein, refers to a material that has a diffuse transmission of visible radiation of at least 50% and a direct transmission of visible radiation of less than 10%. "Opaque" is defined herein as having a direct (i.e., non-diffuse) visible transmission of less than 3%. Visible radiation or "light," as those terms are used herein, refer to electromagnetic energy in the range of 380 nm to 780 nm.

When the EOD 10 is in the first optical state, the elastomer layer 300 preferably is in a default (e.g., relaxed and/or non-compressed) state. The first optical state can optionally be a default (or "static," e.g., non-powered) state of the device. In such cases, when the EOD 10 is in its first optical state, there preferably is no electric field (or at least substantially no electric field) between the two electrodes, and the elastomer layer is therefore in a default state. This, however, is by no means required in all cases. For example, there may be an electric field between the two electrodes when the device is in the first optical state, but in such cases that electric field is weaker or otherwise different than the electric field that is present when the device is in the second optical state. More generally, the electric field can be continuous (DC power) or it can involve AC power (e.g., sine wave or pulsed DC). For an AC signal, the field may alternate between two (or more) voltages (like 0 V and 3,000 V, or 1,000 V and 3,000 V), or the polarity of the field can be reversed.

The EOD 10 is switchable between the first optical state and the second optical state by providing, removing, or adjusting (e.g., increasing) a voltage to the EOD 10. This can be accomplished, for example, by activating or deactivating a switch. This allows the optical properties, and thus the visible appearance, of the EOD 10 to be selectively altered.

The EOD 10 of the present invention has various practical applications. For instance, the EOD 10 can be implemented into smart windows, thus allowing such a window to be used as a privacy glazing (e.g., for privacy glass). In such an example, the EOD 10 can provide a frosted or white opaque appearance when in the second optical state in order to provide a high level of privacy. In other embodiments, the EOD 10 can form part of a door, skylight, or other glazing. Further, the EOD 10 can be part of an internal partition, if so desired.

Many embodiments of the EOD 10 involve a substrate 100 (see FIGS. 1-3, 5-7, 9, 10 and 11). A wide variety of substrate types are suitable for use in the invention. Preferably, the substrate 100 is a sheet-like substrate having generally opposed first and second major surfaces. For example, the substrate 100 can be a sheet of transparent material (i.e., a transparent sheet). The substrate 100 however, is not required to be a sheet, nor is it required to be transparent.

For many applications, the substrate 100 will comprise a transparent (or at least translucent) material, such as glass. For example, the substrate 100 is a glass sheet (e.g., a window pane) in certain embodiments. A variety of known glass types can be used, such as soda-lime glass. In some cases, it may be desirable to use "white glass," a type of glass having low iron content. When substrate 100 is a glass sheet, it typically will not be capable of being wound. This can optionally be the case for any embodiment of the present disclosure.

Substrates of various sizes can be used in the present invention. Commonly, large-area substrates are used. Certain embodiments involve a substrate having a major dimension (e.g., a length or width) of at least about 0.5 meters, preferably at least about 1 meter, perhaps more preferably at least about 1.5 meters (e.g., between about 2 meters and about 4 meters), and in some cases at least about 3 meters. In some embodiments, the substrate 100 is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

Substrates of various thicknesses can be used in the present invention. In some embodiments, the substrate 100 (which can optionally be a glass sheet) has a thickness of 1-14 mm, such as 2-14 mm. Certain embodiments involve a substrate with a thickness of between about 2.3 mm and about 4.8 mm, and perhaps more preferably between about 2.5 mm and about 4.8 mm. In one particular embodiment, a sheet of glass (e.g., soda-lime glass) with a thickness of about 3 mm is used.

As discussed above, substrate 100 can be glass. If desired, the glass can be an extremely thin glass substrate of a composition that enables it to be flexible. In some cases, the substrate 100 is a transparent ceramic material or a transparent plastic material (e.g., a polymeric material). Suitable plastic film substrates include, but are not limited to, a Mylar sheet or film, polymethyl methacrylates, polycarbonates, polyurethanes, polyethyleneterephthalate (PET), or any combinations thereof.

Substrate 100 has opposed surfaces (or faces) 110 and 120, which preferably are major surfaces (as opposed to edge surfaces). In some cases, surface 120 is destined to be an internal surface exposed to a between-pane space of an insulating glazing unit, while surface 110 is destined to be an external surface exposed to an interior of a building (as shown in FIG. 9). This, however, need not be the case in all embodiments.

While embodiments that have a separate substrate have now been described, other embodiments of the EOD 10 do not have a separate substrate (see FIG. 4). In such cases, the EOD 10 preferably includes a self-supporting dielectric layer (e.g., an extruded polymer sheet) that carries on one of its two opposed faces a first transparent electrode 200 while carrying on the other of its two opposed faces an elastomer layer 300 and a second transparent electrode 400. More will be said of this later.

In FIG. 1, the EOD 10 comprises, in sequence, substrate 100, a first transparent electrode 200, an elastomer layer 300, and a second transparent electrode 400. In FIG. 1, the first transparent electrode 200 is in contact with the substrate 100, the elastomer layer 300 is in contact with the first transparent electrode 200, and the second transparent electrode 400 is in contact with the elastomer layer 300. This, however, is not required. As just one example, substrate 100 can be a glass sheet, and a polymer sheet can be provided between the glass sheet and the first transparent electrode 200. In such cases, one of the two opposed faces of the polymer sheet can be adhered or otherwise laminated to the glass sheet while the other of the two opposed faces of the polymer sheet carries the first transparent electrode 200, the elastomer layer 300, and the second transparent electrode 400.

The first transparent electrode 200 is a bottom electrode of the EOD 10. In FIG. 1, the first transparent electrode 200 preferably is a film comprising a transparent electrically-conductive oxide ("TCO"), optionally together with one or more other materials, such as zinc, aluminum, fluorine, carbon nanotubes, or other components. The TCO film can comprise, for example, indium tin oxide ("ITO"), fluorinated tin oxide ("FTO"), a doped zinc oxide, such as aluminum-doped zinc oxide ("AZO"), a doped titanium dioxide, such as niobium-doped $TiO_2$ ("NTO"), or indium cerium oxide.

Preferably, the first transparent electrode 200 comprises an ITO film. This can be the case for any of the embodiments discussed herein relative to any of FIGS. 1-7B, 9, 10, and 11. In such cases, the film can contain various relative percentages of indium and tin. For instance, such an ITO film preferably consists essentially of (e.g., contains more than 90% by weight), or consists of, indium tin oxide. In addition, for such an ITO film, indium preferably is the major constituent on a metal-only basis. That is, indium preferably accounts for more than 50% of the film's total metal weight. In some cases, the composition of such a film on a metal-only basis ranges from about 75% indium/25% tin to about 95% indium/5% tin, such as about 90% indium/10% tin.

In certain embodiments, the first transparent electrode 200 has a thickness in a range of from 70-200 nm, such as from 90-150 nm. For example, the first transparent electrode 200 can optionally have a thickness in a range of from 100-140 nm, perhaps more preferably in a range of from 110-130 nm (e.g., about 120 nm). For any embodiment discussed relative to FIG. 1-7B, 9, 10, or 11, the thickness of the first electrode 200 can optionally be in any one or more of the ranged noted in this paragraph. All thicknesses recited herein are physical (not optical) thicknesses, unless indicated to the contrary.

When the first transparent electrode 200 is a TCO film, the film can optionally be deposited on the substrate 100 by sputtering. Sputtering is a well-known thin film deposition technique. Conventional sputtering techniques can be used to deposit a suitable TCO film.

Referring again to FIG. 1, the elastomer layer 300 can optionally be in contact with the first transparent electrode 200. The elastomer layer 300 is compliant (e.g., soft and readily deformable).

Preferably, the elastomer layer 300 has an elastic modulus of less than 100 kPa. In addition, the elastomer layer 300 preferably has a yield strength of greater than 10 kPa. If desired, the elastomer layer 300 can (optionally in addition to having an elastic modulus and/or a yield strength within the ranges just noted) have a loss coefficient of less than 0.3, a fatigue ratio of greater than 0.1, or both. The terms elastic modulus, yield strength, loss coefficient, and fatigue ratio are defined later in this disclosure. For any embodiment of this disclosure, the elastomer layer 300 can optionally have one or more (e.g., all) of the properties reported in this paragraph within the noted ranges.

In certain embodiments, the elastomer layer 300 comprises a material selected from the group consisting of ethylene-vinyl acetate (EVA), urethane, acrylic (e.g., VHB acrylic from 3M Company of St. Paul, Minn.), polyvinyl butyral (PVB), silicone, and any mixtures thereof. Preferably, the elastomer layer 300 comprises silicone, or is a silicone-based polymer. In some cases, the elastomer layer 300 is a polymethylsiloxane (PDMS) polymer. Exemplary PDMS polymers include those sold under the tradename SYLGARD® (Dow Corning, Midland, Mich.). In certain preferred embodiments, the silicone-based polymer is SYLGARD® 527. As will be appreciated by those of skill in the art, the PDMS polymer can be produced by mixing the precursor and the catalyst of a commercially available SYLGARD® kit in an appropriate ratio, followed by curing the resulting mixture. Other polymers, including other silicone-based polymers, can also be used. For any embodiment of the present disclosure, the elastomer layer 300 can optionally have any type of composition described in this paragraph.

Regardless of the exact composition of the elastomer layer 300, it preferably is a dielectric elastomer. It also preferably is transparent. Thus, for any embodiment of the present disclosure, the elastomer layer 300 preferably is a transparent dielectric elastomer layer.

The elastomer layer 300 in the embodiment of FIG. 1 is depicted as being a single film. However, it is to be appreciated that the elastomer layer 300 can comprise two or more films or sublayers, if so desired. For example, the elastomer layer 300 can comprise two films or sublayers formed of two different elastomers.

In preferred embodiments, the elastomer layer 300 has a total thickness in a range of 5-75 microns. More preferably, the elastomer layer 300 has a total thickness in a range of 5-50 microns (e.g., about 48 microns). It is contemplated, however, that in alternate embodiments, the elastomer layer 300 can have a thickness of up to 250 microns (e.g., in a range of 100-250 microns or 100-150 microns). In such instances, the thicker elastomer layer 300 may necessitate a higher voltage to switch the EOD 10 between its first and second states as compared to a thinner elastomer layer 300. For any embodiment of the present disclosure, the elastomer layer 300 can optionally have a thickness in any one or more of the thickness ranges specified in this paragraph.

The elastomer layer 300 can be deposited via doctor blade coating, a well-known coating technique. In doctor blade coating, the thickness of the layer being applied can be varied by different gap distances between the surface of the substrate being coated and the doctor blade. Alternatively, the elastomer layer 300 can be deposited by other well-known coating techniques, including, but not limited to, spin coating, slot die coating and spray coating.

With continued reference to FIG. 1, the second transparent electrode 400 is a top electrode of the EOD 10. The second transparent electrode 400 comprises an electrically-conductive polymer, electrically-conductive nanoparticles 420, or both. These materials can provide exceptional compliancy in terms of being able to match the strains obtainable with the elastomer layer (e.g., over 100 percent and up to several hundred percent). These materials also provide advantageous process control (e.g., as compared to carbon nanotubes or silver nanowires). For example, these materials may be particularly easy to deposit. Furthermore, the conductive polymer and/or conductive nanoparticles enable the second transparent electrode 400 to be deposited at room temperature. This makes it possible to use certain temperature-sensitive materials (e.g., plastics) in the EOD 10, particularly adjacent the second transparent electrode 400. Moreover, the conductive polymer and/or conductive nanoparticles provide advanced characteristics to the second transparent electrode 400 in terms of being so compliant and deformable as not to exhibit undue stiffness or cracking over time.

Second transparent electrode 400 preferably is devoid of carbon nanotubes and silver nanowires. This preferably is the case for any embodiment of the present disclosure that includes second transparent electrode 400.

When the second transparent electrode 400 comprises electrically-conductive nanoparticles 420, those particles preferably comprise a metal oxide. In some cases, the electrically-conductive nanoparticles consist of, or consist essentially of, the metal oxide. The electrically-conductive nanoparticles 420 can comprise any of the TCO materials listed above for the first transparent electrode 200, including, ITO, FTO, AZO, NTO, or indium cerium oxide nanoparticles. Preferably, the electrically-conductive nanoparticles 420 comprise (or consist of, or consist essentially of) ITO nanoparticles. This can optionally be the case for any embodiment of the present disclosure where the second transparent electrode comprises electrically-conductive nanoparticles. A mix or arrangement of nanoparticles formed of different materials can be used if so desired.

Where the second transparent electrode 400 comprises electrically-conductive nanoparticles 420, they preferably have an average major dimension (e.g., a length, width, or diameter, whichever is greatest) of less than 200 Å. Perhaps more preferably, the nanoparticles 420 have an average major dimension of less than 150 nm, such as less than 100 nm or even less than 50 nm (e.g., about 10 nm).

In some embodiments, the second transparent electrode 400 comprises a nanoparticulate film that includes more than one monolayer of electrically-conductive nanoparticles. In such embodiments, the electrically-conductive nanoparticles 420 preferably are able to shift somewhat relative to one another, thus providing an exceptionally compliant film.

Additionally or alternatively, the second transparent electrode 400 can comprise an electrically-conductive polymer. In certain embodiments, the electrically conductive polymer comprises poly(3,4-ethylenedioxythiophene) or its derivatives. It is envisioned, however, that other electrically-conductive polymers can be used.

In some cases, the electrically-conductive polymer comprises a mixture of two ionomers. For instance, the polymer can comprise poly(3,4-ethylenedioxythiophene):poly(styrene sulfonate) (also known as "PEDOT:PSS"). This can optionally be the case in any embodiment where the second transparent electrode comprises an electrically-conductive polymer.

In some embodiments, the second transparent electrode 400 comprises both electrically-conductive nanoparticles 420 and an electrically-conductive polymer. As shown in FIGS. 5a and 5b, the second transparent electrode 400 can comprise electrically-conductive nanoparticles 420 embedded in an electrically-conductive polymer matrix 425. In some cases, the nanoparticles 420 are embedded entirely within the matrix 425 (so as not to be exposed). In other cases, the nanoparticles 420 are only partially embedded in the matrix 425, such that some or all of them project outwardly from the matrix 425 (so as to be exposed).

In embodiments where the second transparent electrode 400 comprises nanoparticles 420, they can optionally form a continuous or substantially continuous nanoparticulate film. One non-limiting example is shown in FIG. 5a. Here, the nanoparticles are embedded in a matrix of electrically-conductive polymer. FIG. 6 depicts another embodiment wherein the second transparent electrode 400 comprises a continuous or substantially continuous nanoparticulate film. In the embodiment of FIG. 6, the nanoparticulate film is located between an electrically-conductive polymer layer and the elastomer layer 300.

Figure 10:
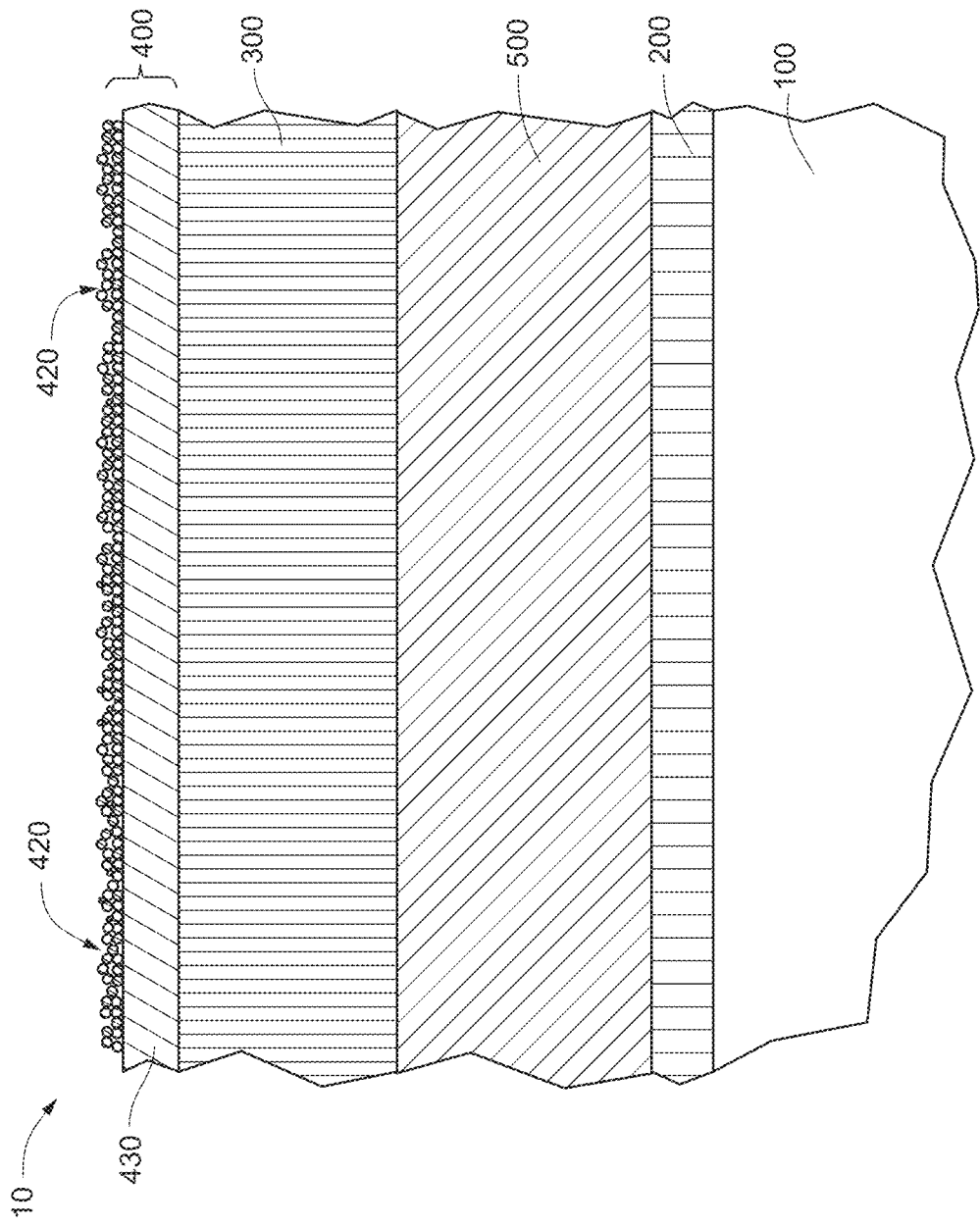
FIG. 10 is a schematic, broken-away cross-sectional view of an elastomeric optical device having a second transparent electrode comprising an electrically-conductive polymer layer under electrically-conductive nanoparticles in accordance with certain embodiments of the present disclosure.

FIG. 10 depicts still another embodiment where the second transparent electrode 400 comprises a nanoparticulate film. Here, the nanoparticulate film is on an electrically-conductive polymer layer. In FIG. 10, the nanoparticulate film preferably is the outermost film or layer of the EOD 10. In addition, the nanoparticulate film of FIG. 10 is shown as being exposed (e.g., not covered by another film or layer).

FIG. 11 depicts yet another embodiment where the second transparent electrode 400 comprises electrically-conductive nanoparticles in the form of a nanoparticulate film. The nanoparticulate film here is in contact with the elastomer layer 300. In addition, the nanoparticulate film in this embodiment is the outermost film or layers of the EOD 10. In addition, it is exposed.

In any embodiment of the present disclosure involving nanoparticles (whether or not they are embedded in any matrix or binder), the nanoparticles can optionally form a continuous or substantially continuous film. As noted above, in some embodiments of this nature, the nanoparticulate film is an outermost (e.g., exposed) portion of the device.

When the second transparent electrode 400 comprises electrically-conductive nanoparticles 420, it preferably has a loading of nanoparticles 420 in the electrically-conductive polymer matrix 425 in a range of from 50% to 90%. As used herein, "loading" refers to the weight percent of the electrically-conductive nanoparticles 420 in the second transparent electrode 400.

In some embodiments, a binder is added to the second transparent electrode 400. This may be the case, for example, when the second transparent electrode 400 comprises a nanoparticulate film that is not embedded in an electrically-conductive polymer layer. When provided, a binder can help promote adhesion of the nanoparticles 420 to each other. Any suitable binder can be used, including, but not limited to, epoxy, polyester, or phenolic resins.

In other embodiments where the second transparent electrode 400 comprises a nanoparticulate film that is not embedded in an electrically-conductive polymer, the electrically-conductive nanoparticles 420 preferably are fused together. Such fusing may involve Van der Waals forces.

When neighboring electrically-conductive nanoparticles 420 are fused together, they can form an interconnected electrically-conductive nanoparticulate film. It should be noted that, even when fused or adhered together, the nanoparticulate film preferably is flexible or deformable enough that the second transparent electrode 400 remains compliant. For example, even though adjacent nanoparticles may be fused together or adhered together (or otherwise held together by attractive force), they preferably still allow relative shifting of one or more particles relative to neighboring particles. This can advantageously allow the nanoparticulate film to shift or otherwise deform as required when the EOD changes from one optical state to another.

The electrically-conductive nanoparticles 420 may form a film that is continuous over the entire area of the second transparent electrode (e.g., over the entire area of the surface on which the nanoparticles are deposited). Alternatively, as shown schematically in FIG. 5b and discussed in greater detail below, there can be gaps between the nanoparticles 420 (which gaps in some embodiments are filled by a matrix 425) so as to create non-uniformity features in the second transparent electrode 400.

When provided, the electrically-conductive polymer can form an electrically-conductive polymer layer 430. In some cases, the second transparent electrode 400 consists of (Or at least consists essentially of) an electrically-conductive polymer layer. In other cases, an electrically-conductive polymer layer 430 is positioned over or under electrically-conductive nanoparticles 420. In a preferred embodiment shown in FIG. 6, the electrically-conductive polymer layer 430 is provided over the electrically-conductive nanoparticles 420. Here, at least some of the nanoparticles 420 are in contact with (i.e., touching) the elastomer layer 300. Alternatively, an intermediate layer can optionally be provided between the elastomer layer 300 and the nanoparticles 420, such that the nanoparticles 420 and the elastomer layer 300 are not in contact with each other. In other cases, the electrically-conductive polymer layer 430 is provided under the electrically-conductive nanoparticles, as shown in FIG. 10.

Thus, the second transparent electrode 400 can optionally be deposited or otherwise formed onto an outer surface of the elastomer layer 300. For example, electrically-conductive nanoparticles 420 can be deposited (e.g., by spray coating) onto the elastomer layer 300, and then an electrically-conductive polymer layer 430 can be deposited (e.g., sprayed) or otherwise formed over the nanoparticles 420. Thereafter, the second transparent electrode 400 may be cured, either by temperature or ultraviolet radiation. Another alternative is to premix and deposit electrically-conductive polymer and electrically-conductive nanoparticles and deposit them together onto the elastomer layer 300.

Figure 2:
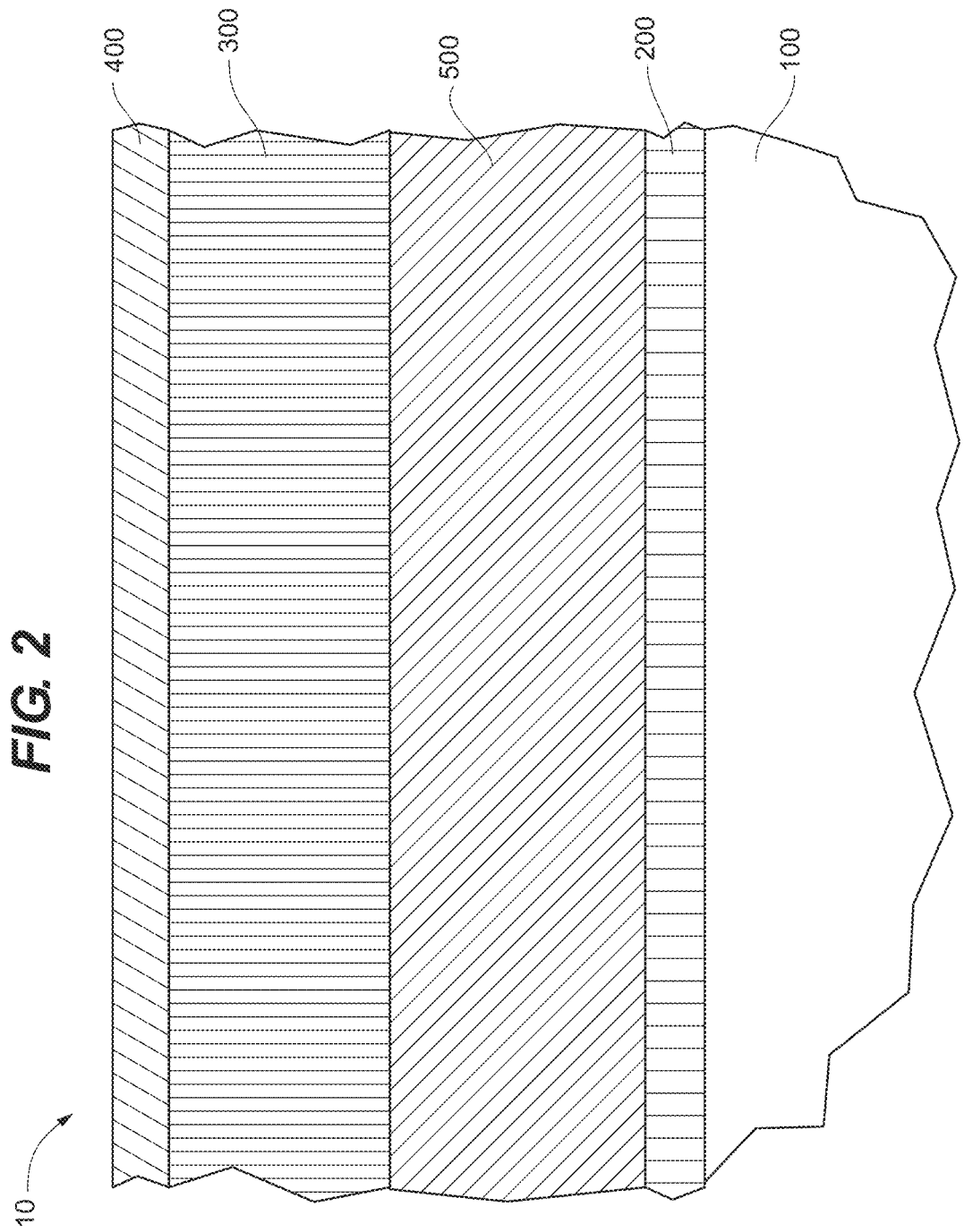
FIG. 2 is a schematic, broken-away cross-sectional view of an elastomeric optical device in accordance with other embodiments of the present disclosure.

Referring now to FIG. 2, the EOD 10 can optionally include a dielectric layer 500. In such embodiments, the dielectric layer 500 is located between (optionally directly between, i.e., so as to contact both) the first transparent electrode 200 and the elastomer layer 300. Thus, as shown in FIG. 2, the EOD 10 can comprise, in sequence, the substrate 100, the first transparent electrode 200, the dielectric layer 500, the elastomer layer 300, and the second transparent electrode 400. Where provided, the dielectric layer 500 can help avoid electrical shorting of the EOD 10.

In any embodiments that include the dielectric layer, it preferably is a transparent dielectric layer. In such cases, the transparent dielectric can optionally comprise (or consist of, or at least consist essentially of) an elastomer. Another option is for the transparent dielectric to be an inorganic layer, which may be deposited by sputtering, chemical vapor deposition, or other conventional deposition processes.

Preferably, the dielectric layer 500 comprises (e.g., consists of, or at least consists essentially of) a polymer. Suitable polymers include a polyimide, a silicone-based polymer, and polyethylene terephthalate (PET). The dielectric layer 500 preferably is a silicone-based polymer, such as a PDMS polymer. In certain embodiments, the silicone-based polymer is SYLGARD® 184 (Dow Corning). It is envisioned, however, that other polymers, including other silicone-based polymers, can be used.

In some cases, the dielectric layer 500 is a single layer of a single dielectric material or a single layer including a mixture of different dielectric materials. In other cases, the dielectric layer 500 comprises a plurality of sublayers (e.g., two or more sublayers), optionally formed of different dielectric materials.

When provided, the dielectric layer 500 preferably has a greater stiffness than the elastomer layer 300. In such cases, the dielectric layer 500 can have an elastic modulus of 1 MPa or higher. This can optionally be the case for any embodiment of the present disclosure where the dielectric layer 500 is provided.

The dielectric layer 500 preferably has a thickness in a range of 0.5-50 microns, such as 5-50 microns, or 10-35 microns. In some examples, its thickness is about 25 microns.

In certain embodiments, the dielectric layer 500 is an extruded film having a thickness of 15-25 microns. In such embodiments, the dielectric layer 500 (e.g., an extruded film of PET) can optionally be adhered or laminated to substrate 100 (with the first transparent electrode therebetween). Substrate 100 may be glass in those cases.

The dielectric layer 500, unless it is an extruded film, can be deposited using doctor blade coating. Alternatively, the dielectric layer 500 can be deposited by other well-known coating techniques, including, but not limited to, spin coating, slot die coating and spray coating.

Figure 3:
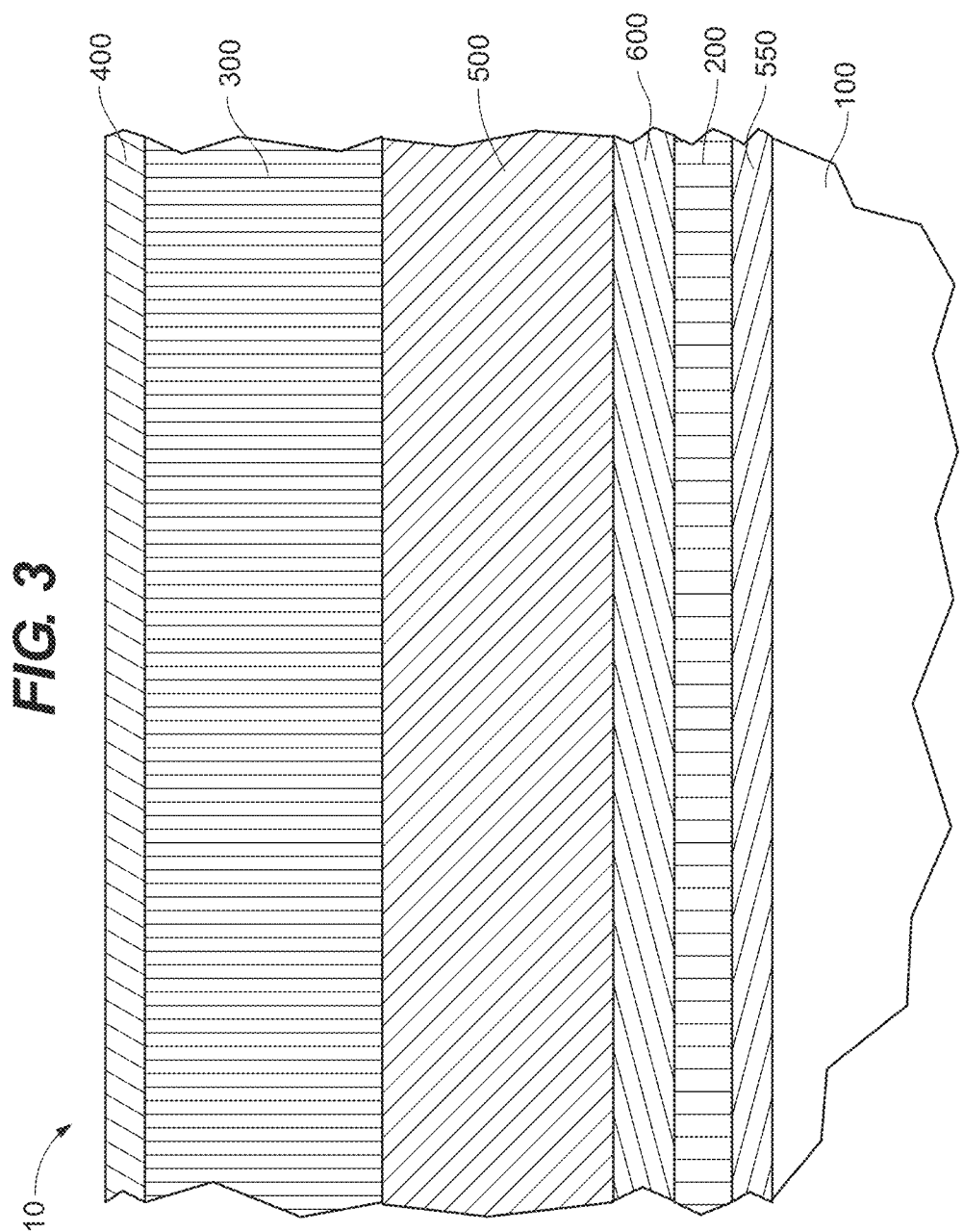
FIG. 3 is a schematic, broken-away cross-sectional view of an elastomeric optical device in accordance with certain other embodiments of the present disclosure.

Referring now to the embodiment of FIG. 3, the EOD 10 can comprise, in sequence, the substrate 100, a base film 550, the first transparent electrode 200, an overcoat film 600, the optional dielectric layer 500, the elastomer layer 300, and the second transparent electrode 400. The base film 550 can be in contact with the substrate 100; the first transparent electrode 200 can be in contact with the base film 550; the overcoat film 600 can be in contact with the first transparent electrode 200; the dielectric layer 500 can be in contact with the overcoat film 600; the elastomer layer 300 can be in contact with the dielectric layer 500; and the second transparent electrode 400 can be in contact with the elastomer layer 300. As can be appreciated by comparing FIGS. 1-3, the base film 550, dielectric layer 500, and overcoat film 600 are optional and may be omitted. Although not shown in all figures of the present disclosure, the dielectric layer 500 can optionally be present (e.g., added to) any embodiment shown or described herein, absent an indication to the contrary.

As shown in FIG. 3, the optional base film 550 can be provided between the substrate 100 and the first transparent electrode 200. The base film 550 can be provided as an adhesion layer and/or a diffusion barrier to prevent (or at least reduce) diffusion of material (such as sodium ions in the case of soda-lime glass) from the substrate 100 into the first transparent electrode 200.

When provided, the base film 550 may comprise, consist essentially of, or consist of silica, alumina, or a mixture of both. In other embodiments, the base film 550 comprises tin oxide (e.g., $SnO_2$). In such embodiments, the base film 550 may be devoid of indium. For example, a base film 550 consisting of (or at least consisting essentially of) tin oxide is provided in some cases. In still other embodiments, the base film comprises (or consists essentially of, or consists of) silicon nitride or silicon oxynitride. Compounds of two or more of silica, silicon nitride, alumina, and tin oxide can be used. Preferably, the base film 550 comprises silica, silicon nitride, and/or silicon oxynitride (optionally with some aluminum).

While the base film 550 is shown as a single layer, it can alternatively comprise a plurality of sublayers. Where provided, the base film 550 preferably has a total thickness of 50 Å or more, such as about 70-300 Å. In certain embodiments, the base film 550 has a total thickness of 75-150 Å. In one example, the base film 550 has a total thickness of about 100 Å.

With continued reference to FIG. 3, an optional overcoat film 600 can be located over the first transparent electrode 200. In such cases, the dielectric layer 500 is separated from the first transparent electrode 200 by the overcoat film 600. In some cases, the overcoat film 600 comprises silicon oxynitride. In other cases, the overcoat film 600 comprises tin oxide, which preferably is devoid of indium oxide. In such cases, the overcoat film 600 preferably contains at least 75% tin, at least 85% tin, or at least 95% tin (on a metal-only basis), while also being devoid of indium oxide. For example, the overcoat film 600 may consist of (or at least consist essentially of) tin oxide (e.g., $SnO_2$). Alternatively, the overcoat film 600 can comprise silicon nitride.

The overcoat film 600 preferably has a thickness in a range of from 675-1125 Å. For example, the overcoat film 600 can have a thickness in a range of 775-1025 Å, or from 875-925 Å. In some cases, the overcoat film 600 has a thickness of about 900 Å. In other cases, it has a thickness of about 940 Å. If desired, silicon oxynitride (optionally including some aluminum) can be used at any thickness range noted in this paragraph. This can optionally be the case for any embodiment where the overcoat film 600 is provided.

The optional base film 550 and the optional overcoat film 600 can be formed by sputtering. Sputtering is well known in the present art. Reference is made to Pfaff's U.S. Pat. No. 9,862,640, the teachings of which are incorporated by reference herein insofar as they describe sputtering. It should be noted, however, that these films are not restricted to being formed by such methods, and other conventional techniques can be used.

As discussed above, certain embodiments of the EOD 10 do not have (i.e., are devoid of) a separate substrate. FIG. 4 shows a non-limiting example of one such embodiment. Specifically, in the embodiment of FIG. 4, the EOD 10 comprises, in sequence, the first transparent electrode 200, the dielectric layer 500, the elastomer layer 300, and the second transparent electrode 400. In embodiments like that shown in FIG. 4, the EOD 10 is a self-supporting film. Although the dielectric layer 500 is optional in many embodiments, it is used in this embodiment to provide support for the other layers of the EOD 10. Although not shown in FIG. 4, one more additional layers, such as a base film 550 and/or an overcoat film 600, can optionally be included in such an EOD 10.

While FIGS. 5a, 5b, and 6 show EODs 10 each having an arrangement of layers similar to FIG. 1, it will be appreciated by skilled artisans that any of the second transparent electrode 400 options discussed relative to FIGS. 5a, 5b, and 6 can optionally be used in any of the embodiments of FIGS. 1-4. Thus, for example, the dielectric layer 500 can optionally be added to the embodiments of FIGS. 5a, 5b, and 6.

In addition to the second electrode 400 comprising electrically-conductive polymer and/or electrically-conductive nanoparticles 420, the second electrode 400 can optionally comprise carbon nanotubes and/or electrically-conductive nanowires (e.g., silver nanowires). However, for any embodiment shown in FIG. 1-7b, 9, 10, or 11 the second transparent electrode preferably is devoid of carbon nanotubes and silver nanowires.

The second transparent electrode 400 can be characterized by certain mechanical features. This is true whenever it comprises electrically-conductive polymer, electrically-conductive nanoparticles, or both. One such feature is the elastic modulus (also known as the modulus of elasticity or Young's modulus). The elastic modulus measures the resistance of an object or a substance to being deformed elastically (i.e., non-permanently) when a stress is applied to it. The elastic modulus of an object is defined as the slope of its stress-strain curve in the elastic deformation region. The greater the stiffness of a material, the higher its elastic modulus, whereas the lesser the stiffness of a material, the lower its elastic modulus. The second transparent electrode 400 has a low elastic modulus, thus allowing it to change shape easily. Preferably, the second transparent electrode 400 has an elastic modulus of less than 5 GPa, more preferably less than 2 GPa, and perhaps optimally less than 1.2 GPa. The second transparent electrode 400 in any embodiment of this disclosure preferably has an elastic modulus in one or more (e.g., all) of the ranges noted in this paragraph.

The second transparent electrode 400 can also be characterized by its yield strength. Yield strength is the minimum stress that produces permanent plastic deformation. The yield strength is usually defined at a specific amount of plastic strain, or offset, which may vary by material and or specification. The offset is the amount that the stress-strain curve deviates from the linear elastic line. The most common offset for polymers is 1%. In preferred embodiments, the second transparent electrode 400 has a yield strength of greater than 0.5 MPa, more preferably greater than 1 MPa, and perhaps optimally greater than 2 MPa (based on a 1% offset). In any embodiment of the present disclosure, the second transparent electrode 400 can optionally have a yield strength in one or more (e.g., all) of the ranges noted in this paragraph. Preferably, this is in combination with having an elastic modulus in any one or more (e.g., all) of the ranges noted in the previous paragraph.

The second transparent electrode 400 can also be characterized by its fatigue ratio (also known as endurance limit). The fatigue ratio is a dimensionless ratio of the stress required to cause fatigue failure after a specific number of cycles to the yield stress of a material. Fatigue tests are generally run through $10^7$ or $10^8$ cycles. Preferably, the second transparent electrode 400 has a fatigue ratio of greater than 0.1, more preferably greater than 0.3, and perhaps optimally greater than 0.5. In any embodiment of the present disclosure, the second transparent electrode 400 can optionally have a fatigue ratio in one or more (e.g., all) of the ranges noted in this paragraph. This preferably is in combination with having a yield strength in any one or more (e.g., all) of the ranges notes in the previous paragraph and/or having an elastic modulus in any one or more (e.g., all) of the elastic modulus ranges noted above.

The loss coefficient is a material parameter of cyclic loading that measures the fraction of mechanical energy lost in a stress strain cycle. The loss coefficient for each material is a function of the frequency of the cycle. A high loss coefficient can be desirable for damping vibrations, while a low loss coefficient transmits energy more efficiently. The loss coefficient is a factor in resisting fatigue failure. If the loss coefficient is too high, cyclic loading will dissipate energy into the material, thereby leading to fatigue failure. Preferably, the second transparent electrode 400 has a loss coefficient of less than 0.3, more preferably less than 0.1, and perhaps optimally less than 0.06. In any embodiment of the present disclosure, the second transparent electrode 400 can optionally have a loss coefficient in one or more (e.g., all) of the ranges noted in this paragraph. Preferably, this is in combination with having an elastic modulus in any one or more (e.g., all) of the elastic modules ranges noted above. In addition, the second transparent electrode preferably has a yield strength and/or a fatigue ratio in any one or more (e.g., all) of the ranges noted above for those two properties.

In accordance with certain embodiments of the present invention, the second transparent electrode 400 is characterized by the following combination of features: a Young's modulus of less than 5 GPa, a yield strength of greater than 0.5 MPa, a loss coefficient of less than 0.3, and a fatigue ratio of greater than 0.1. More preferably, the second transparent electrode 400 is characterized by a Young's modulus of less than 1.2 GPa, a yield strength of greater than 2 MPa, a loss coefficient of less than 0.06, and a fatigue ratio of greater than 0.5. This combination of features can optionally be present for the second transparent electrode 400 in any embodiment of the present disclosure.

The second transparent electrode 400 has a relatively low sheet resistance. Preferably, it is in a range of 10-1000 ohms/square, more preferably 25-250 ohms/square, and perhaps optimally 40-60 ohms/square. For any embodiment of the present disclosure, the second transparent electrode 400 can optionally have a sheet resistance in one or more (e.g., all) of the ranges noted in this paragraph. In addition, its elastic modulus can optionally be in any one or more (e.g., all) of the elastic modulus ranges noted above, and/or its fatigue ratio can optionally be in any one or more (e.g., all) of the fatigue ratio ranges noted above.

The second transparent electrode 400 preferably has low emissivity. Specifically, the second transparent electrode 400 preferably has an emissivity of less than 0.5, more preferably less than 0.4, and perhaps optimally less than 0.3. For any embodiment of the present disclosure, the second transparent electrode 400 can optionally have an emissivity in one or more (e.g., all) of the ranges noted in this paragraph. In addition, its sheet resistance can optionally be in any one or more (e.g., all) of the ranges noted in the previous paragraph. This preferably is in combination with its elastic modulus being in any one or more (e.g., all) of the elastic modulus ranges noted above, and/or its fatigue ratio being in any one or more (e.g., all) of the fatigue ratio ranges noted above.

The term "emissivity" is well known in the present art. This term is used herein in accordance with its well-known meaning to refer to the ratio of radiation emitted by a surface to the radiation emitted by a blackbody at the same temperature. Emissivity is a wavelength dependent property, and the emissivity at each wavelength must equal the absorptivity. But it can be useful to calculate a single emissivity value that takes into account all of the relevant wavelengths of light. The present emissivity values can be determined as specified in "Standard Test Method for Emittance of Specular Surfaces Using Spectrometric Measurements," NFRC 301-2010, the entire teachings of which are incorporated herein by reference.

The second transparent electrode 400 preferably has a visible absorption of less than or equal to 6%, more preferably less than or equal to 4%, and perhaps optimally less than or equal to 2%. For any embodiment of the present disclosure, the second transparent electrode 400 can optionally have a visible absorption in any one or more (e.g., all) of the ranges noted in this paragraph. This preferably is in combination with the sheet resistance of the second transparent electrode being in any one or more (e.g., all) of the sheet resistance ranges noted above. In addition, the elastic modulus of the second transparent electrode preferably is in any one or more (e.g., all) of the elastic modulus ranges noted above and/or its fatigue ratio can optionally be in any one or more (e.g., all) of the fatigue ratio ranges noted above. As is well-known to skilled artisans, visible absorption (expressed as a percentage) equals 100 minus $T_{vis}$ minus $R_{vis}$.

In accordance with certain embodiments described above, the second transparent electrode 400 has the following combination of properties: a sheet resistance in a range of 10-1000 ohms/square, an emissivity of less than 0.5, and a visible absorption of less than or equal to 6%. More preferably, the second transparent electrode 400 has a sheet resistance in a range of 10-60 ohms/square, an emissivity of less than 0.3, and a visible absorption of less than or equal to 2%. This combination of properties can optionally be present in the second transparent electrode 400 of any embodiment of this disclosure.

In preferred embodiments, the second transparent electrode 400 has a total thickness in a range of 100-500 nm, such as 225-375 nm. For example, the second transparent electrode 400 can have a thickness in a range of 250-350 nm, or 275-325 nm (e.g., about 300 nm). For any embodiment shown in or discussed with respect to FIG. 1-7b, 9, 10, or 11, the second transparent electrode can optionally have a thickness in any one or more (e.g., all) of the ranges noted in this paragraph. This can optionally be in combination with the second transparent electrode having: (i) a sheet resistance in any one or more (e.g., all) of the sheet resistance ranges noted above, and (ii) a visible absorption in any one or more (e.g., all) of the visible absorption ranges noted above. In addition, its elastic modulus and/or fatigue ratio can optionally be in any one or more (e.g., all) of the ranges noted above for those two properties.

The optical properties of the EOD 10 can be electrically controlled. By adjusting a voltage applied to the first 200 and second 400 transparent electrodes, it is possible to change the visible transmission properties of the EOD 10. Specifically, when a voltage is applied to the first 200 and second 400 transparent electrodes, these electrodes 200, 400 establish an electric field between each other and across the elastomer layer 300. In response to such an electric field being established (e.g., by achieving a threshold voltage), the first 200 and second 400 transparent electrodes are attracted to each other, such that the second transparent electrode 400 compresses the elastomer layer 300. This may involve the elastomer layer 300 being compressed against the dielectric layer 500 (when present) or the first transparent electrode 200 or any overcoat film 600. The compression of the elastomer layer preferably involves the elastomer layer bulging upwardly in some places. Once the applied voltage is lowered or removed, the elastomer layer 300 returns to its original, un-compressed (or "static") state. Thus, by applying, removing, or otherwise adjusting the voltage applied to the first 200 and second 400 transparent electrodes, it is possible to switch the EOD 10 between a transparent state (i.e., the first optical state) and a translucent or opaque state (i.e., the second optical state). The EOD 10 can be reversibly switched between its first optical state 20 and its second optical state 30. The EOD 10 preferably can do so without observable degradation or damage. Thus, the EOD 10 and all its layers preferably maintain all their original properties (e.g., electrical and optical properties) even after the voltage is lowered or removed.

At least certain portions of the second transparent electrode 400 are closer to the first transparent electrode 200 when the EOD 10 is in the second optical state than they are when the EOD 10 is in the first optical state. This results in the second transparent electrode 400 having a surface topography that is characterized by greater roughness, less flatness of its outer face, or both when the EOD 10 is in the second optical state 30 than when it is in the first optical state 20. This can be appreciated by comparing FIG. 7*a* (schematically showing the EOD 10 in the first optical state 20) and FIG. 7*b* (schematically showing the EOD 10 in the second optical state 30).

Surface roughness is defined herein in terms of deviations from the mean surface level. The surface roughness $R_a$ is the arithmetical mean surface roughness. This is the arithmetic average of the absolute deviations from the mean surface level. The arithmetical mean surface roughness of a coating is commonly represented by the equation: $R_a=1/L\int_0^L |f(x)|dx$. The surface roughness $R_a$ can be measured in conventional fashion, e.g., using an Atomic Force Microscope (AFM) equipped with conventional software that gives $R_a$.

In some embodiments, the surface topography of the EOD 10 is characterized by wrinkles when the EOD 10 is in its second optical state 30. Such wrinkles may include both dimples and bulges (e.g., bumps). Wrinkles may also comprise or form ridges or lines, akin to the ridges or lines of a person's fingertip (i.e., fingerprints). Dimples are recesses (e.g., concavities) and may in some cases be generally round. This can be thought of, in a very general or schematic way, as being akin to the dimples on a golf ball. It should be noted that the surface deformations of the EOD 10 will normally be present on a microscopic scale.

Figure 7A:
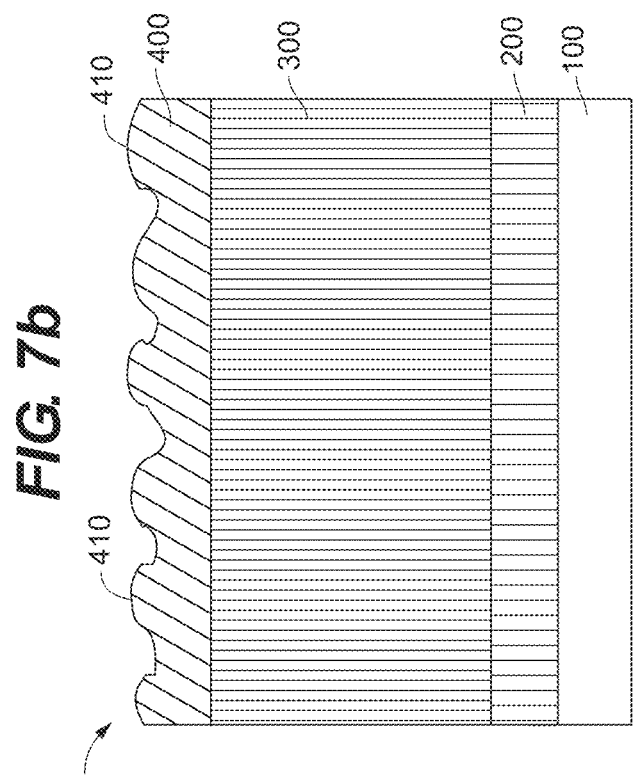
FIG. 7a is a schematic cross-sectional view of an elastomeric optical device in accordance with certain embodiments of the present disclosure, with the device shown in its first optical state.
Figure 7B:
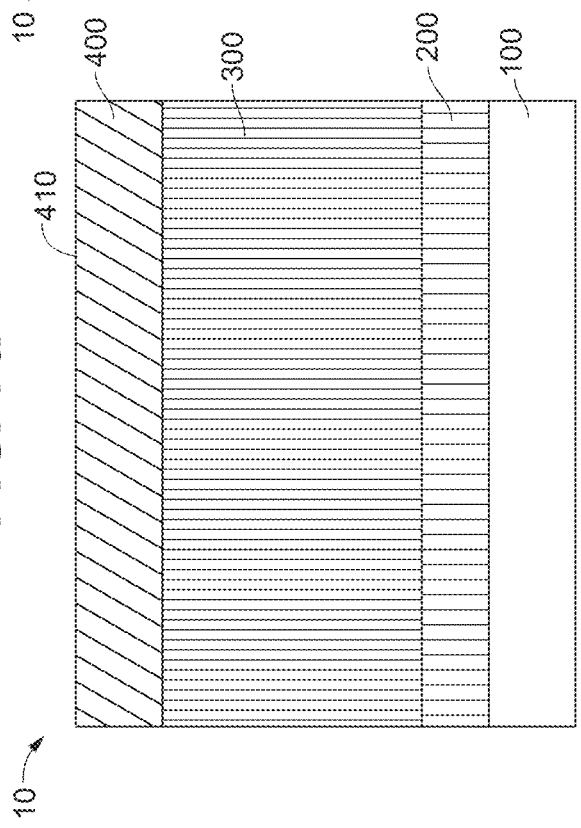
FIG. 7b is a schematic cross-sectional view of the elastomeric optical device of FIG. 7a shown in its second optical state.

As shown schematically in FIG. 7*a*, an upper surface 410 of the second transparent electrode 400 may initially be generally planar. When the threshold voltage is applied, this upper surface 410 wrinkles (as shown schematically in FIG. 7*b*). The wrinkling process is reversible, such that the wrinkles appear when the threshold voltage is applied and disappear when the voltage is removed or sufficiently lowered.

The wrinkling causes changes in the optical properties of the EOD 10. Specifically, wrinkling of a surface (e.g., upper surface 410) causes diffuse visible transmission and light scattering, thereby reducing the direct (i.e., non-diffuse) transmission of visible radiation through the surface. Thus, when the EOD 10 is in the second optical state 30 (i.e., is translucent or opaque), it is because wrinkles of the EOD 10 cause light to scatter. To the contrary, when the EOD 10 is in its first optical state (i.e., is transparent), the EOD 10 has an absence of, or minimal, wrinkling.

The thicknesses of one or more layers of the EOD 10 can be adjusted to achieve a desired surface topography when the device is in the second optical state. For example, when the elastomer layer 300 is thicker, it may produce larger and/or differently configured wrinkles.

If desired, either the elastomer layer 300 or the second transparent electrode 400 (or each of them) can have one or more non-uniformity features. When provided, the one or more non-uniformity features are present when the EOD is in its first optical state. Such non-uniformity features may help achieve particular optical characteristics that impact the performance of the EOD 10.

In some embodiments, the second transparent electrode 400 has one or more non-uniformity features. The one or more non-uniformity features can optionally comprise non-uniform thickness. Additionally or alternatively, the one or more non-uniformity features can involve the second transparent electrode having non-uniform surface roughness. One or both such features may be provided, for example, by depositing or otherwise forming the second transparent electrode 400 so as to have (e.g., when initially deposited or otherwise formed) non-uniform thickness, non-uniform surface roughness, or both. Another option is to provide variations in thickness and/or surface roughness by performing one or more patterned removal or other modification steps (e.g., laser etching) after the second transparent electrode 400 has been deposited or otherwise formed.

If desired, the second transparent electrode 400 can be non-uniform in terms of its composition. As one non-limiting example, the second transparent electrode 400 can have a plurality of first regions having a first composition and a plurality of second regions having a second composition. In this example, the first composition is different from the second composition.

As depicted schematically in FIG. 5*b*, the one or more non-uniformity features can comprise a plurality of nano-particle regions 440 each having electrically-conductive nanoparticles 420 (e.g., a cluster, concentration, or relatively great local thickness). At other regions of the second transparent electrode 400 (e.g., outside the nanoparticle regions 440) either there are no electrically-conductive nanoparticles 420 or there is a lesser concentration or thickness of them.

In some embodiments where the second transparent electrode 400 is non-uniform in that it has nanoparticle regions 440 of the nature described above, those regions 440 preferably have an average major dimension (e.g., a length, width, or diameter) of greater than one micron and less than 100 microns. In more preferred embodiments, the average major dimension of the nanoparticle regions 440 is greater than one micron and less than 50 microns. Each such nanoparticle region 440 can optionally consist of (or at least consist essentially of) the electrically-conductive nanoparticles.

In certain embodiments, electrically-conductive nanoparticles and/or electrically-conductive polymer are deposited in a controlled manner so as to intentionally achieve certain non-uniformities. For example, the nanoparticles and/or nanoparticle regions 440 can be arranged into a pattern, such as a grid or matrix. This can be accomplished, for example, by ink jet printing nanoparticles and/or nanoparticle regions 440 into a desired pattern on the elastomer layer 300, and then depositing (e.g., spraying) an electrically-conductive polymer layer 430 thereover. Additionally or alternatively, nozzles may be used to control spraying different droplet sizes in order to achieve non-uniformities in the size of the electrically-conductive nanoparticles 420 and/or the sizes of different nanoparticle regions 440.

The elastomer layer 300 can optionally have one or more non-uniformity features. When provided, this can be in addition to, or instead of, the second transparent electrode having one or more non-uniformity features. In certain embodiments, the one or more non-uniformity features comprise non-uniform thickness of the elastomer layer 300. Thus, certain areas of the elastomer layer 300 may be thinner than other areas of the elastomer layer 300. In preferred embodiments, such non-uniform thickness of the elastomer layer 300 is characterized by an average peak-to-valley distance that is at least 25 nm, such as in a range of 25-50 nm.

Figure 8:
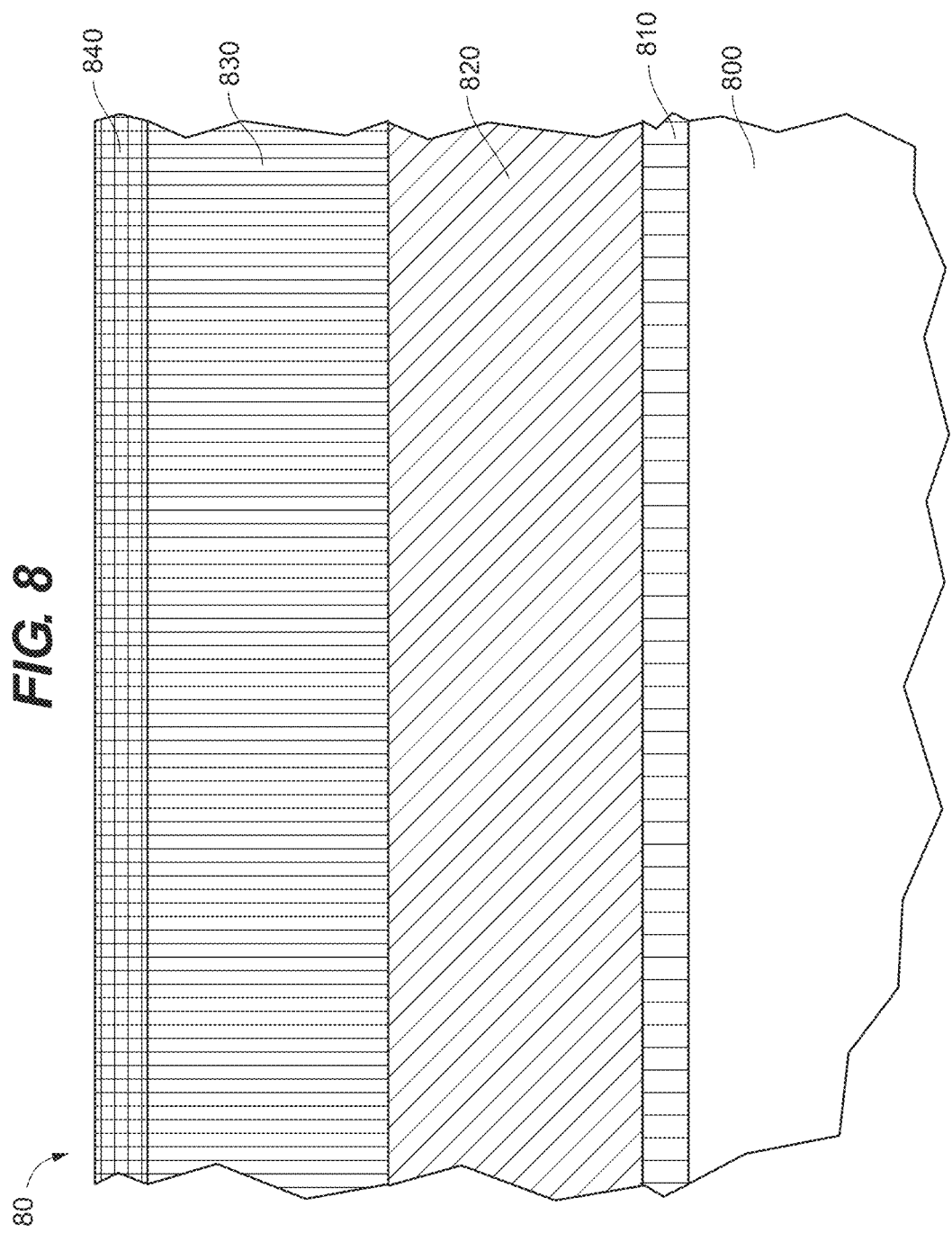
FIG. 8 is a schematic, broken-away cross-sectional view of an alternate embodiment of an elastomeric optical device in accordance with certain embodiments of the present disclosure.

As shown in FIG. 8, an alternative EOD (i.e., EOD 80) can be provided. In the embodiment of FIG. 8, EOD 80 comprises, in sequence, substrate 800, first transparent electrode 810, optional dielectric layer 820, elastomer layer 830, and second transparent electrode 840. In certain embodiments, these layers are contiguous to each other, such that the first transparent electrode 810 is in contact with the substrate 800, the dielectric layer 820 is in contact with the first transparent electrode 810, the elastomer layer 830 is in contact with the dielectric layer 820, and the second transparent electrode 840 is in contact with the elastomer layer 830.

The substrate 800 of EOD 80 may be similar to the substrate 100 of EOD 10. For example, substrate 800 preferably is transparent and it may have the same structure, materials, and dimensions listed above for substrate 100.

The first transparent electrode 810 is a bottom electrode of the EOD 80. In the embodiment of FIG. 8, the first transparent electrode comprises an electrically-conductive polymer, transparent electrically-conductive nanoparticles 420, or both. In this respect, the first transparent electrode 810 of EOD 80 is similar to the second transparent electrode 400 of EOD 10. Thus, the first transparent electrode 810 can have the same structure, materials, dimensions, and features/properties described above for the second transparent electrode 400. When the first transparent electrode 810 comprises (or consists of, or at least consists essentially of) an electrically-conductive polymer, it preferably comprises PEDOT:PSS. In some cases, the first transparent electrode 810 comprises electrically-conductive nanoparticles embedded in an electrically-conductive polymer matrix. Preferred electrically-conductive nanoparticles for the first transparent electrode 810 comprise ITO nanoparticles, although other electrically-conductive nanoparticles can be used. In some cases, the first transparent electrode 810 comprises an electrically-conductive polymer provided as an electrically-conductive polymer layer positioned either over or under the electrically-conductive nanoparticles (e.g., similar to the second transparent electrode 400 shown in FIG. 6 or 10).

As shown in FIG. 8, an optional dielectric layer 820 can be provided between the first transparent electrode 810 and the elastomer layer 300. Similar to dielectric layer 500, dielectric layer 820 may be desired to help prevent electrical shorting of the EOD 80. Dielectric layer 820 can have the same structure, materials, dimensions, and properties described above for dielectric layer 500. In some cases, dielectric layer 820 is an extruded film (e.g., a film of PET) laminated to the substrate 800 (with the first transparent electrode 810 between the substrate 800 and the dielectric layer 820). In other cases, the dielectric layer 820 is omitted from the embodiment of FIG. 8. In such cases, the elastomer layer 830 may be in contact with the first transparent electrode 810 or an overcoat film positioned over the first transparent electrode.

With continued reference to FIG. 8, elastomer layer 830 is provided between the dielectric layer 820 and the second transparent electrode 840. Elastomer layer 830 is similar to elastomer layer 300, and thus, can have the same structure, materials, dimensions, and features/properties described above for elastomer layer 300.

The second transparent electrode 840 is a top electrode of the EOD 80. The second transparent electrode 840 is compliant. In the embodiment of FIG. 8, the second transparent electrode 840 preferably comprises carbon nanotubes (e.g., single-walled carbon nanotubes), silver nanowires, or both. When provided, the carbon nanotubes and/or silver nanowires can form a mesh or network. In other embodiments, the second transparent electrode 840 can comprise the same materials as the second transparent electrode 400 of EOD 10. In such cases, each of the two transparent electrodes 810, 840 of EOD 80 comprises electrically-conductive polymer, electrically-conductive nanoparticles, or both.

In embodiments where second electrode 840 comprises carbon nanotubes, silver nanowires, or both, it preferably has a thickness of from 7.5-12.5 nm. For example, the second transparent electrode 840 can have a thickness of from 8.5-11.5 nm, such as about 10 nm.

When provided, the carbon nanotubes of the second transparent electrode 840 can be deposited onto the elastomer layer 830 by, for example, forming a stable colloidal suspension of carbon nanotubes, and then forming it into a percolating mat by filtration and contact pressing it onto the elastomer layer 830. One useful technique is described in Shian et al., *Highly Compliant Transparent Electrodes*, 2012, *Applied Physics Letters* 101 (6): 061101, doi: 10.1063/1.4742889, the teachings of which are incorporated herein by reference insofar as they relate to preparing and depositing carbon nanotubes as a transparent electrode layer.

As another example, carbon nanotubes can be deposited by spraying a dispersion of carbon nanotubes in a solution using commercially available ultrasonic spray coating equipment (such as from Nadetech Innovations S.L., of Navarra, Spain). The surface can be treated (e.g., chemically, with UV, ozone, or plasma) to affect the surface wetting of the CNT solution, the substrate can be heated to speed up drying of the solution, and the atmosphere (e.g., inert gas, vacuum, humidity) can optionally be controlled during the deposition process. The dispersion can be purchased commercially, or it can be produced by dispersing dry nanotubes in a solution. In such cases, the solution may comprise water, alcohols, organic solvents, surfactants, and other compounds. The nanotubes may be purified or functionalized. Alternatively, a method such as slot die coating could be used to deposit the carbon nanotubes.

The carbon nanotubes preferably are single-walled carbon nanotubes. This can advantageously be the case for any embodiment of the present disclosure wherein second transparent electrode 840 comprises carbon nanotubes. Carbon nanotubes can be purchased from such commercial suppliers as Nanostructured & Amorphous Materials, Inc. (Katy, Tex. USA).

In embodiments where second transparent electrode 840 comprises silver nanowires, various deposition techniques can be used. As one example, silver nanowires can be deposited by spraying a dispersion of them in a solution using commercially available ultrasonic spray coating equipment. The surface can be treated (e.g., chemically, with UV, ozone, or plasma) to affect the surface wetting of the AgNW solution, the substrate can be heated to speed up drying of the solution, and the atmosphere can optionally be controlled during the deposition process. The dispersion can be purchased commercially, or it can be produced by dispersing dry silver nanowires in a solution. In such cases, the solution may comprise water, alcohols, organic solvents, surfactants, and other compounds. The silver nanowires may be purified or functionalized. Alternatively, a method such as slot die coating could be used to deposit the silver nanowires.

For embodiments where silver nanowires are embedded in an electrically-conductive polymer layer, an electrohydrodynamic atomization technique can be used. One exemplary technique is described in Duraisamy et al., *Deposition and Characterization of Silver Nanowires Embedded PEDOT:PSS Thin Films via Electrohydrodynamic Atomization,* 2013, Chemical Engineering Journal, Volume 225, 1 Jun. 2013, Pages 887-894, the teachings of which are incorporated herein by reference insofar as they relate to the formation of silver nanowires embedded in an electrically-conductive polymer layer.

Silver nanowires can be purchased from such commercial suppliers as Nanostructured & Amorphous Materials, Inc. The silver nanowires can be purchased in dry form or in the form of a suspension of silver together with ethanol, isopropanol, or water.

Similar to EOD 10, optical properties of EOD 80 can be electrically controlled. By adjusting a voltage applied to the first 810 and second 840 transparent electrodes, it is possible to change the visible transmission properties of the EOD 80. Specifically, when a voltage is applied to the first 810 and second 840 transparent electrodes, these electrodes 810, 840 establish an electric field between each other and across the elastomer layer 830. In response to such an electric field being established (e.g., by achieving a threshold voltage), the first 810 and second 840 transparent electrodes are attracted to each other, such that the second transparent electrode 840 compresses the elastomer layer 830. This compression of the elastomer layer preferably involves the elastomer layer bulging upwardly in some places. Once the applied voltage is lowered or removed, the elastomer layer 830 returns to its original, un-compressed (or "static") state. Thus, by applying, removing, or otherwise adjusting the voltage applied to the first 810 and second 840 transparent electrodes, it is possible to switch the EOD 80 between a transparent state (i.e., the first optical state) and a translucent or opaque state (i.e., the second optical state). The EOD 80 can be reversibly switched between its first optical state and its second optical state. The EOD 80 preferably can do so without observable degradation or damage. Thus, the EOD 80 and all its layers preferably maintain all their original properties (e.g., electrical and optical properties) even after the voltage is lowered or removed.

The surface topography of EOD 80 is characterized by wrinkles when the device is in its second optical state. The wrinkles of EOD 80 are of the nature described above for the wrinkles of EOD 10. Likewise, the wrinkles of EOD 80 cause the type of changes to the optical properties of EOD 80 as do the wrinkles of EOD 10.

Similar to EOD 10, an upper surface of the second transparent electrode 840 of EOD 80 may initially be generally planar. When the threshold voltage is applied, the upper surface of the second transparent electrode 840 wrinkles (similar to that shown schematically in FIG. 7*b* for EOD 10). This wrinkling process is reversible, such that the wrinkles appear when the threshold voltage is applied and disappear when the voltage is removed or sufficiently lowered.

The thicknesses of the layers of EOD 80 can be adjusted to achieve a desired surface topography. When the elastomer layer 830 is thicker, for example, it may produce larger and/or differently configured wrinkles.

If desired, either the elastomer layer 830 or the second transparent electrode 840 (or each of them) can have one or more non-uniformity features. These non-uniformity features can be the nature described above relative to EOD 10. When provided, the one or more non-uniformity features are present when the EOD 80 is in its first optical state. Such non-uniformity features, explained in greater detail below, may help achieve particular optical characteristics that impact the performance of the EOD 80.

In some embodiments, the second transparent electrode 840 has one or more non-uniformity features. The one or more non-uniformity features can comprise non-uniform thickness. Thus, one or more areas of the second transparent electrode 840 may be thinner than other areas of the second transparent electrode 840. Additionally or alternatively, the one or more non-uniformity features may involve the second transparent electrode 840 having non-uniform surface roughness.

The elastomer layer 830 can optionally have one or more non-uniformity features. When provided, this can be in addition to, or instead of, the second transparent electrode having one or more non-uniformity features. In certain embodiments, the one or more non-uniformity features comprise non-uniform thickness of the elastomer layer 830. Thus, certain areas of the elastomer layer 830 may be thinner than other areas of the elastomer layer 830. In preferred embodiments, the non-uniform thickness of the elastomer layer 830 is characterized by an average peak-to-valley distance that is at least 25 nm such as in a range of 25-50 nm.

Although certain preferred thickness values have been provided for the different layers of EOD 10 and EOD 80, it is to be understood that any of the thickness values can be varied to suit a particular application. For example, it is possible for one or more of the thickness values to deviate considerably from preferred thickness values reported herein.

In any embodiment of the present disclosure, the EOD 10, 80 can be part of an insulating glazing unit ("IG" unit) 40. As shown in FIG. 9, the IG unit 40 includes an interior pane 100 and an exterior pane 105 separated by a between-pane space 45. A spacer 50 (which can optionally be part of a sash) is commonly provided to separate the panes 100, 105. The spacer 50 can be secured to the internal surface of each of panes 100, 105 using an adhesive or seal 55. In some cases, an optional end sealant (or "second seal") 60 is also provided.

In FIG. 9, the exterior pane 105 has an external surface 130 (the #1 surface) and an internal surface 140 (the #2 surface). The interior pane 100 has an internal surface 120 (the #3 surface) and an external surface 110 (the #4 surface). In other embodiments, the IG unit 40 has three panes, such that the external surface of the inboard pane is a #6 surface.

The IG unit 40 can optionally be mounted in a frame (e.g., a conventional window sash or frame) such that the external surface 130 of the exterior pane 105 is exposed to an outdoor environment 77 (and thus is exposed to periodic contact with rain) while the external surface of the inboard pane is exposed to a room-side environment (e.g., an ambient environment inside a building). Each internal surface of the IG unit 40 is exposed to a between-pane space 45 of the IG unit 40. In some embodiments, the IG unit 40 is a vacuum IG unit.

In the embodiment of FIG. 9, the internal surface 120 of the interior pane 100 is defined by substrate 100 of EOD 10. Here, the EOD 10 is exposed to a between-pane space of the IG unit. While it would be possible to provide EOD 10 or EOD 80 on the #1 or #4 surface, it preferably is on either the #2 or #3 surface. In the case of a triple-pane IG unit, the EOD preferably is on the #2 surface, the #3 surface, the #4 surface, or the #5 surface. Such arrangements ensure that the EOD protected against potential durability issues caused by water, physical contact, or the like.

Alternatively, EOD 10 or EOD 80 can be a suspended film device. For example, a stretched film (e.g., a polymer film) can be provided between two glass panes of an IG unit. In such cases, the stretched film forms part of the EOD, and permits it to be suspended between, and spaced from, such two glass panes 100, 105.

The IG unit 40 may also include one or more low-emissivity coatings 70. In the embodiment of FIG. 9, the IG unit 40 includes a low-emissivity coating 70 on the internal surface 140 of the exterior pane 105. When provided, the low-emissivity coating 70 preferably includes at least one silver-inclusive film, which can advantageously contain more than 50% silver by weight (e.g., a metallic silver film). If desired, the low-emissivity coating 70 can alternatively be on the internal surface 120 of pane 100 (provided that the EOD 10 is on another surface of the same pane or another pane). Thus, when the low-emissivity coating is provided, it preferably is on the #2 surface of the IG unit, but it may alternatively be on the #3 surface. In some embodiments, the coating 70 includes three or more infrared-reflective films (e.g., silver-containing films). Low-emissivity coatings with three or more infrared-reflective films are described in U.S. patent Ser. No. 11/546,152 and U.S. patent Ser. No. 11/545,211 and U.S. Pat. Nos. 7,572,511 and 7,572,510 and 7,572,509 and 7,342,716 and 7,339,728, the teachings of each of which are incorporated herein by reference. In other cases, the low-emissivity coating can be a "single silver" or "double silver" low-emissivity coating, which are well-known to skilled artisans.

When the EOD 10, 80 is in the first optical state, it has a high visible transmittance. In some cases, the visible transmission of the EOD 10, 80 when in the first optical state is at least 75%, such as 75%-90%. Preferably, the visible transmission is in a range from 85-90%. The visible transmission numbers reported in this paragraph are for the EOD in monolithic form (e.g., as shown in FIG. 7).

The term "visible transmittance" is well known in the art and is used herein in accordance with its well-known meaning to refer to the percentage of all incident visible radiation that is transmitted through an IG unit. Visible transmittance, as well as visible reflectance, can be determined in accordance with NFRC 300-2014, Standard Test Method for Determining the Solar and Infrared Optical Properties of Glazing Materials and Fading Resistance of Systems. The well-known WINDOW 7.1 computer program can be used in calculating these and other reported optical properties.

A method of operating an EOD is also provided. The method can involve any EOD 10, 80 of the present disclosure. The method comprises applying voltage to the first 200, 810 and second 400, 840 transparent electrodes to establish an electric field therebetween, such that in response to the electric field, the second transparent electrode 400, 840 compresses the elastomer layer 300, 830. The method generates wrinkles when the EOD switches from the first optical state to the second optical state. After then maintaining the EOD in the second optical state for a desired period of time, the method subsequently involves switching the EOD from the second optical state to the first optical state. This may involve lowering or removing the voltage applied to the first 200, 810 and second 400, 840 transparent electrodes. Additionally or alternatively, it may involve alternating the electric field between two (or more) voltages, such as between 0 V and 3,000 V, or between 1,000 V and 3,000 V. In some embodiments, the polarity of the electric field is reversed in order to switch the EOD between its first and second states. As noted above, the EOD is reversibly switchable between the first optical state and the second optical state.

Following are two non-limiting embodiments of elastomeric optical devices of the present invention.

Example 1—EOD 10

An ITO film (first transparent electrode 200) having a thickness of 120 nm was deposited onto 3 mm soda-lime glass (substrate 100) by sputtering. The ITO film is a film comprising 90% indium/10% tin on a metal-only basis. Next, SYLGARD® 184 (dielectric layer 500, thickness of 25 microns) was deposited onto the ITO film by doctor blade coating. Then, SYLGARD® 527 (elastomer layer 300, thickness of 48 microns) was deposited onto the SYLGARD® 184 via doctor blade coating. Finally, PEDOT:PSS (second transparent electrode 400, thickness of 300 nm) was deposited onto the SYLGARD® 527 via doctor blade coating.

Example 2—EOD 80

PEDOT:PSS (first transparent electrode 810, thickness of 300 nm) was deposited onto 3 mm soda-lime glass (substrate 800) via doctor blade coating. An extruded film of polyethylene terephthalate (PET) (dielectric layer 820, thickness of 25 microns) was laminated to the glass substrate (with electrode 810 therebetween). SYLGARD® 527 (elastomer layer 830, thickness of 48 microns) was deposited onto the PET via doctor blade coating. Carbon nanotubes at a thickness of about 10 nm (second transparent electrode 840) were deposited onto the SYLGARD® 527 by spray deposition of a dispersion of carbon nanotubes in solution using an ultrasonic spray nozzle.

While some preferred embodiments of the invention have been described, it should be understood that various changes, adaptations and modifications may be made therein without departing from the spirit of the invention and the scope of the appended claims.

What is claimed is:

1. An elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, an elastomer layer, and a second transparent electrode, the second transparent electrode comprising an electrically-conductive polymer, electrically-conductive nanoparticles comprising a metal oxide, or both, the second transparent electrode configured to compress the elastomer layer in response to an electric field between the first and second transparent electrodes, such that when the elastomeric optical device is in the second optical state the elastomer layer is compressed between the first and second transparent electrodes, wherein at least certain portions of the second transparent electrode are closer to the first transparent electrode when the elastomeric optical device is in the second optical state than they are when the elastomeric optical device is in the first optical state, the elastomeric optical device having a surface topography that is characterized by greater roughness when the elastomeric optical device is in its second optical state than when it is in its first optical state.

2. The elastomeric optical device of claim 1 wherein the surface topography of the elastomeric optical device when in its second optical state is characterized by wrinkles, the wrinkles including both dimples and bulges.

3. The elastomeric optical device of claim 1 wherein the second transparent electrode is characterized by a Young's modulus of less than 5 GPa, a yield strength of greater than 0.5 MPa, a loss coefficient of less than 0.3, and a fatigue ratio of greater than 0.1.

4. The elastomeric optical device of claim 3 wherein the second transparent electrode has an electrical conductivity in a range of 10-1000 ohms/square, an emissivity of less than 0.5, and a visible absorption of less than 6%.

5. The elastomeric optical device of claim 1 wherein the second transparent electrode is characterized by a Young's modulus of less than 1.2 GPa, a yield strength of greater than 2 MPa, a loss coefficient of less than 0.06, and a fatigue ratio of greater than 0.5.

6. The elastomeric optical device of claim 5 wherein the second transparent electrode has an electrical conductivity in a range of 10-60 ohms/square, an emissivity of less than 0.3, and a visible absorption of less than 2%.

7. The elastomeric optical device of claim 1 wherein the second transparent electrode comprises the electrically-conductive polymer, and the electrically-conductive polymer includes a mixture of two ionomers.

8. The elastomeric optical device of claim 1 wherein the second transparent electrode comprises the electrically-conductive polymer, and the electrically-conductive polymer comprises poly(3,4-ethylenedioxythiophene):poly(styrene sulfonate).

9. The elastomeric optical device of claim 1 wherein the second transparent electrode comprises the electrically-conductive nanoparticles in a matrix of the electrically-conductive polymer.

10. The elastomeric optical device of claim 9 wherein the second transparent electrode has a loading of the electrically-conductive nanoparticles in the matrix of the electrically-conductive polymer in a range of from 50% to 90%.

11. The elastomeric optical device of claim 9 wherein the electrically-conductive nanoparticles comprise indium tin oxide.

12. The elastomeric optical device of claim 1 wherein the elastomer layer has a thickness in a range of 5-75 microns.

13. The elastomeric optical device of claim 1 wherein the elastomer layer comprises a material selected from the group consisting of EVA, urethane, acrylic, PVB, and silicone.

14. The elastomeric optical device of claim 1 wherein the second transparent electrode comprises both the electrically-conductive polymer and the electrically-conductive nanoparticles, the electrically-conductive polymer provided as an electrically-conductive polymer layer over the electrically-conductive nanoparticles.

15. The elastomeric optical device of claim 1 wherein the second transparent electrode comprises the electrically-conductive nanoparticles, the electrically-conductive nanoparticles being in contact with the elastomer layer.

16. The elastomeric optical device of claim 1 wherein, when the elastomeric optical device is in the first optical state, the second transparent electrode has one or more non-uniformity features.

17. The elastomeric optical device of claim 16 wherein the one or more non-uniformity features comprise a plurality of nanoparticle regions each having some of the electrically-conductive nanoparticles, such that at regions of the second transparent electrode outside the nanoparticle regions either there are none of the electrically-conductive nanoparticles or there is a lesser concentration of the electrically-conductive nanoparticles than at the nanoparticle regions.

18. The elastomeric optical device of claim 17 wherein the nanoparticle regions have an average major dimension of greater than one micron and less than 100 microns.

19. The elastomeric optical device of claim 18 wherein the average major dimension of the nanoparticle regions is greater than one micron and less than 50 microns.

20. The elastomeric optical device of claim 17 wherein the nanoparticle regions are arranged in a pattern.

21. The elastomeric optical device of claim 16 wherein the one or more non-uniformity features of the second transparent electrode comprise non-uniform surface roughness.

22. The elastomeric optical device of claim 21 wherein the non-uniform surface roughness is arranged in a pattern.

23. The elastomeric optical device of claim 1 wherein the elastomer layer has one or more non-uniformity features.

24. The elastomeric optical device of claim 23 wherein the one or more non-uniformity features comprise non-uniform thickness of the elastomer layer.

25. The elastomeric optical device of claim 24 wherein the non-uniform thickness of the elastomer layer is arranged in a pattern.

26. The elastomeric optical device of claim 24 wherein the non-uniform thickness of the elastomer layer is characterized by a minimum peak-to-valley distance in a range of 25 nm to 50 nm.

27. The elastomeric optical device of claim 1 further comprising a glass substrate that carries the first transparent electrode, the elastomer layer, and the second transparent electrode.

28. The elastomeric optical device of claim 1 wherein the second transparent electrode comprises the electrically-conductive nanoparticles, and the electrically-conductive nanoparticles of the second transparent electrode consist essentially of the metal oxide.

29. The elastomeric optical device of claim 1 wherein the second transparent electrode comprises the electrically-conductive nanoparticles, and the electrically-conductive nanoparticles each have an average major dimension of less than 150 nm.

30. The elastomeric optical device of claim 1 wherein the elastomeric optical device is part of a privacy glazing smart window, such that the elastomeric optical device when in the second optical state has a frosted or white opaque appearance.

31. The elastomeric optical device of claim 1 wherein the elastomeric optical device is configured to change from the second optical state to the first optical state in response to reducing a voltage between the first and second transparent electrodes such that there is still an electric field between the first and second transparent electrodes when the elastomeric optical device is in the first optical state but it is weaker than when the elastomeric optical device is in the second optical state.

32. The elastomeric optical device of claim 1 wherein the elastomeric optical device has an absence of wrinkling when the elastomeric optical device is in the first optical state.

33. The elastomeric optical device of claim 1 wherein the elastomeric optical device has a monolithic visible transmission in a range of from 85-90% when the elastomeric optical device is in the first optical state.

34. An elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, an elastomer layer, and a second transparent electrode, the second transparent electrode comprising an electrically-conductive polymer, electrically-conductive nanoparticles comprising a metal oxide, or both, the second transparent electrode configured to compress the elastomer layer in response to an electric field between the first and second transparent electrodes, such that when the elastomeric optical device is in the second optical state the elastomer layer is compressed between the first and second transparent electrodes, the elastomeric optical device further comprising a dielectric layer between the first transparent electrode and the elastomer layer, the dielectric layer having a greater stiffness than the elastomer layer.

35. The elastomeric optical device of claim 34 wherein the dielectric layer has a thickness in a range of 0.5-50 microns.

36. The elastomeric optical device of claim 34 wherein the elastomeric optical device is part of a privacy glazing smart window, such that the elastomeric optical device when in the second optical state has a frosted or white opaque appearance.

37. The elastomeric optical device of claim 34 wherein the elastomeric optical device is configured to change from the second optical state to the first optical state in response to reducing a voltage between the first and second transparent electrodes such that there is still an electric field between the first and second transparent electrodes when the elastomeric optical device is in the first optical state but it is weaker than when the elastomeric optical device is in the second optical state.

38. The elastomeric optical device of claim 34 wherein the elastomeric optical device has an absence of wrinkling when the elastomeric optical device is in the first optical state.

39. The elastomeric optical device of claim 34 wherein the elastomeric optical device has a monolithic visible transmission in a range of from 85-90% when the elastomeric optical device is in the first optical state.

40. An elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, an elastomer layer, and a second transparent electrode, the first transparent electrode comprising an electrically-conductive polymer, electrically-conductive nanoparticles comprising a metal oxide, or both, the second transparent electrode comprising carbon nanotubes or silver nanowires, the second transparent electrode configured to compress the elastomer layer in response to an electric field between the first and second transparent electrodes, such that when the elastomeric optical device is in the second optical state the elastomer layer is compressed between the first and second transparent electrodes, the elastomeric optical device further comprising a dielectric layer between the first transparent electrode and the elastomer layer, the dielectric layer having a greater stiffness than the elastomer layer.

41. The elastomeric optical device of claim 40 further comprising a polymer substrate that carries the first transparent electrode, the elastomer layer, and the second transparent electrode.

42. The elastomeric optical device of claim 41 wherein the polymer substrate is mounted to a glass pane.

43. The elastomeric optical device of claim 42 wherein the glass pane is part of a multi-pane insulating glazing unit having a between-pane space, the elastomeric optical device being exposed to the between-pane space.

44. The elastomeric optical device of claim 43 wherein the multi-pane insulating glazing unit further includes a low-emissivity coating on a #2 surface or a #4 surface of the multi-pane insulating glazing unit, and the elastomeric optical device is located further from a #1 surface of the multi-pane insulating glazing unit than is the low-emissivity coating such that solar radiation passing into the multi-pane insulating glazing unit through the #1 surface reaches the low-emissivity coating before reaching the elastomeric optical device, the multi-pane insulating glazing unit mounted in a position such that its #1 surface is exposed to an outdoor environment.

45. The elastomeric optical device of claim 40 wherein the dielectric layer is an extruded film that is laminated to a glass pane.

46. The elastomeric optical device of claim 40 wherein the first transparent electrode comprises the electrically-conductive nanoparticles, and the electrically-conductive nanoparticles of the first transparent electrode consist essentially of the metal oxide.

47. The elastomeric optical device of claim 40 wherein the first transparent electrode comprises the electrically-conductive nanoparticles, and the electrically-conductive nanoparticles each have an average major dimension of less than 150 nm.

48. The elastomeric optical device of claim 40 wherein the elastomeric optical device is part of a privacy glazing smart window, such that the elastomeric optical device when in the second optical state has a frosted or white opaque appearance.

49. The elastomeric optical device of claim 40 wherein the elastomeric optical device is configured to change from the second optical state to the first optical state in response to reducing a voltage between the first and second transparent electrodes such that there is still an electric field between the first and second transparent electrodes when the elastomeric optical device is in the first optical state but it is weaker than when the elastomeric optical device is in the second optical state.

50. The elastomeric optical device of claim 40 wherein the elastomeric optical device has an absence of wrinkling when the elastomeric optical device is in the first optical state.

51. The elastomeric optical device of claim 40 wherein the elastomeric optical device has a monolithic visible transmission in a range of from 85-90% when the elastomeric optical device is in the first optical state.

\* \* \* \* \*